US008879957B2

(12) United States Patent
Hanson et al.

(10) Patent No.: US 8,879,957 B2
(45) Date of Patent: Nov. 4, 2014

(54) ELECTROPHOTOGRAPHY-BASED ADDITIVE MANUFACTURING SYSTEM WITH RECIPROCATING OPERATION

(75) Inventors: William J. Hanson, Carlsbad, CA (US); J. Randolph Sanders, Rancho Santa Fe, CA (US); Michael W. Bacus, Temecula, CA (US); Steven A. Chillscyzn, Victoria, MN (US)

(73) Assignee: Stratasys, Inc., Eden Prairie, MN (US)

( * ) Notice: Subject to any disclaimer, the term of this patent is extended or adjusted under 35 U.S.C. 154(b) by 258 days.

(21) Appl. No.: 13/242,669

(22) Filed: Sep. 23, 2011

(65) Prior Publication Data
US 2013/0077996 A1  Mar. 28, 2013

(51) Int. Cl.
G03G 15/01 (2006.01)
G03G 15/00 (2006.01)
G03G 15/22 (2006.01)

(52) U.S. Cl.
CPC .................................. *G03G 15/225* (2013.01)
USPC .......................................................... 399/130

(58) Field of Classification Search
USPC ......................................... 399/130, 111, 401
See application file for complete search history.

(56) References Cited

U.S. PATENT DOCUMENTS

| | | | |
|---|---|---|---|
| 2,297,691 A | 10/1942 | Carlson | |
| 4,988,602 A | 1/1991 | Jongewaard et al. | |
| 5,088,047 A | 2/1992 | Bynum | |
| 5,099,288 A | 3/1992 | Britto et al. | |
| 5,254,421 A | 10/1993 | Coppens et al. | |
| 5,354,414 A | 10/1994 | Feygin | |
| 5,514,232 A | 5/1996 | Burns | |
| 5,593,531 A | 1/1997 | Penn | |
| 5,594,652 A | 1/1997 | Penn et al. | |
| 5,866,058 A | 2/1999 | Batchelder et al. | |
| 5,981,616 A | 11/1999 | Yamamura et al. | |
| 5,990,268 A | 11/1999 | Dickens, Jr. et al. | |
| 6,052,551 A | 4/2000 | De Cock et al. | |
| 6,066,285 A | 5/2000 | Kumar | |
| 6,169,605 B1 | 1/2001 | Penn et al. | |
| 6,206,672 B1 | 3/2001 | Grenda | |
| 6,329,115 B1 | 12/2001 | Yamashita | |
| 6,376,148 B1 | 4/2002 | Liu et al. | |

(Continued)

FOREIGN PATENT DOCUMENTS

| | | |
|---|---|---|
| CN | 101310964 A | 11/2008 |
| EP | 0712051 A2 | 5/1996 |

(Continued)

OTHER PUBLICATIONS

Jones, Jason, "Selective Laser Printing", Published Prior to Jan. 14, 2013, 1 page.

(Continued)

*Primary Examiner* — Quana M Grainger
(74) *Attorney, Agent, or Firm* — Brian R. Morrison; Westman, Champlin & Koehler, P.A.

(57) ABSTRACT

An additive manufacturing system for printing a three-dimensional part using electrophotography, the additive manufacturing system comprising a rotatable photoconductor component, first and second development stations configured to develop layers of materials on a surface of the rotatable photoconductor component while the rotatable photoconductor component rotates in opposing rotational directions, and a platen configured to operably receive the developed layers in a layer-by-layer manner to print the three-dimensional part from at least a portion of the received layers.

20 Claims, 22 Drawing Sheets

(56) References Cited

U.S. PATENT DOCUMENTS

| | | |
|---|---|---|
| 6,509,128 B1 | 1/2003 | Everaerts et al. |
| 6,531,086 B1 | 3/2003 | Larsson .................. 264/497 |
| 6,780,368 B2 | 8/2004 | Liu et al. |
| 6,799,959 B1 | 10/2004 | Tochimoto et al. |
| 6,815,636 B2 | 11/2004 | Chung et al. ............. 219/121.65 |
| 6,887,640 B2 | 5/2005 | Zhang et al. |
| 7,011,783 B2 | 3/2006 | Fong |
| 7,077,638 B2 | 7/2006 | Leyden et al. |
| 7,184,677 B2 * | 2/2007 | Tanaka et al. ............. 399/66 |
| 7,208,257 B2 | 4/2007 | Cheng et al. |
| 7,261,541 B2 | 8/2007 | Fong |
| 7,261,542 B2 | 8/2007 | Hickerson et al. |
| 7,291,242 B2 | 11/2007 | Khoshnevis ............. 156/308.2 |
| 7,435,763 B2 | 10/2008 | Farr et al. |
| 7,815,826 B2 | 10/2010 | Serdy et al. |
| 7,988,906 B2 | 8/2011 | Monsheimer et al. |
| 8,047,251 B2 | 11/2011 | Khoshnevis .............. 156/497 |
| 8,119,053 B1 | 2/2012 | Bedal et al. ............... 264/308 |
| 8,124,192 B2 | 2/2012 | Paasche et al. ............. 427/470 |
| 8,147,910 B2 | 4/2012 | Kritchman |
| 8,173,258 B2 | 5/2012 | Monsheimer et al. |
| 8,216,757 B2 | 7/2012 | Mizutani et al. |
| 8,221,671 B2 | 7/2012 | Hull et al. .................. 264/405 |
| 8,249,480 B2 | 8/2012 | Aslam et al. ............... 399/69 |
| 2002/0093115 A1 | 7/2002 | Jang et al. |
| 2002/0145213 A1 | 10/2002 | Liu et al. |
| 2004/0232583 A1 | 11/2004 | Monsheimer et al. |
| 2005/0207801 A1 | 9/2005 | Kunii et al. |
| 2005/0218549 A1 | 10/2005 | Farr et al. |
| 2008/0032083 A1 | 2/2008 | Serdy et al. |
| 2008/0169589 A1 | 7/2008 | Sperry et al. |
| 2008/0171284 A1 | 7/2008 | Hull et al. |
| 2008/0226346 A1 | 9/2008 | Hull et al. |
| 2009/0236775 A1 | 9/2009 | Monsheimer et al. |
| 2011/0117485 A1 | 5/2011 | Hermann et al. ........ 430/108.6 |
| 2012/0041132 A1 | 2/2012 | Monsheimer et al. |
| 2012/0139167 A1 | 6/2012 | Fruth et al. ................. 264/497 |
| 2012/0201960 A1 | 8/2012 | Hartmann et al. .......... 427/256 |
| 2012/0202012 A1 | 8/2012 | Grebe et al. |
| 2012/0237870 A1 | 9/2012 | Watanabe et al. |
| 2012/0263488 A1 | 10/2012 | Aslam et al. ................ 399/68 |
| 2012/0274002 A1 | 11/2012 | Uchida ....................... 264/447 |
| 2013/0171434 A1 | 7/2013 | Hirth et al. |

FOREIGN PATENT DOCUMENTS

| | | | |
|---|---|---|---|
| GB | 2446386 A | | 8/2008 |
| JP | 05088588 A | * | 4/1993 |
| JP | 5165350 A | | 7/1993 |
| JP | 8281808 A | | 10/1996 |
| JP | 2001075376 A | | 3/2001 |
| JP | 2002347129 A | | 12/2002 |
| JP | 2003053849 A | | 2/2003 |
| JP | 2003071940 A | | 3/2003 |
| JP | 2005062860 A | | 3/2005 |
| JP | 2006182813 A | | 7/2006 |
| WO | 9851464 A1 | | 11/1998 |
| WO | 2004037469 A1 | | 5/2004 |
| WO | 2007114895 A2 | | 10/2007 |
| WO | WO-2011065920 A1 | | 6/2011 |
| WO | 2012/034666 A1 | | 3/2012 |

OTHER PUBLICATIONS

International Search Report and Written Opinion dated Jan. 30, 2013 from International Patent Application No. PCT/US2012/056599, filed Sep. 21, 2012.

U.S. Appl. No. 12/675,098, filed Feb. 24, 2010, entitled "Toner Composition, Developer Comprising the Toner Composition, and Method in Connection with the Production of a Volume Body".

"Xerography", Aug. 27, 2010, pp. 1-4, http:/en.wikipedia.org/wiki/Xerography.

* cited by examiner

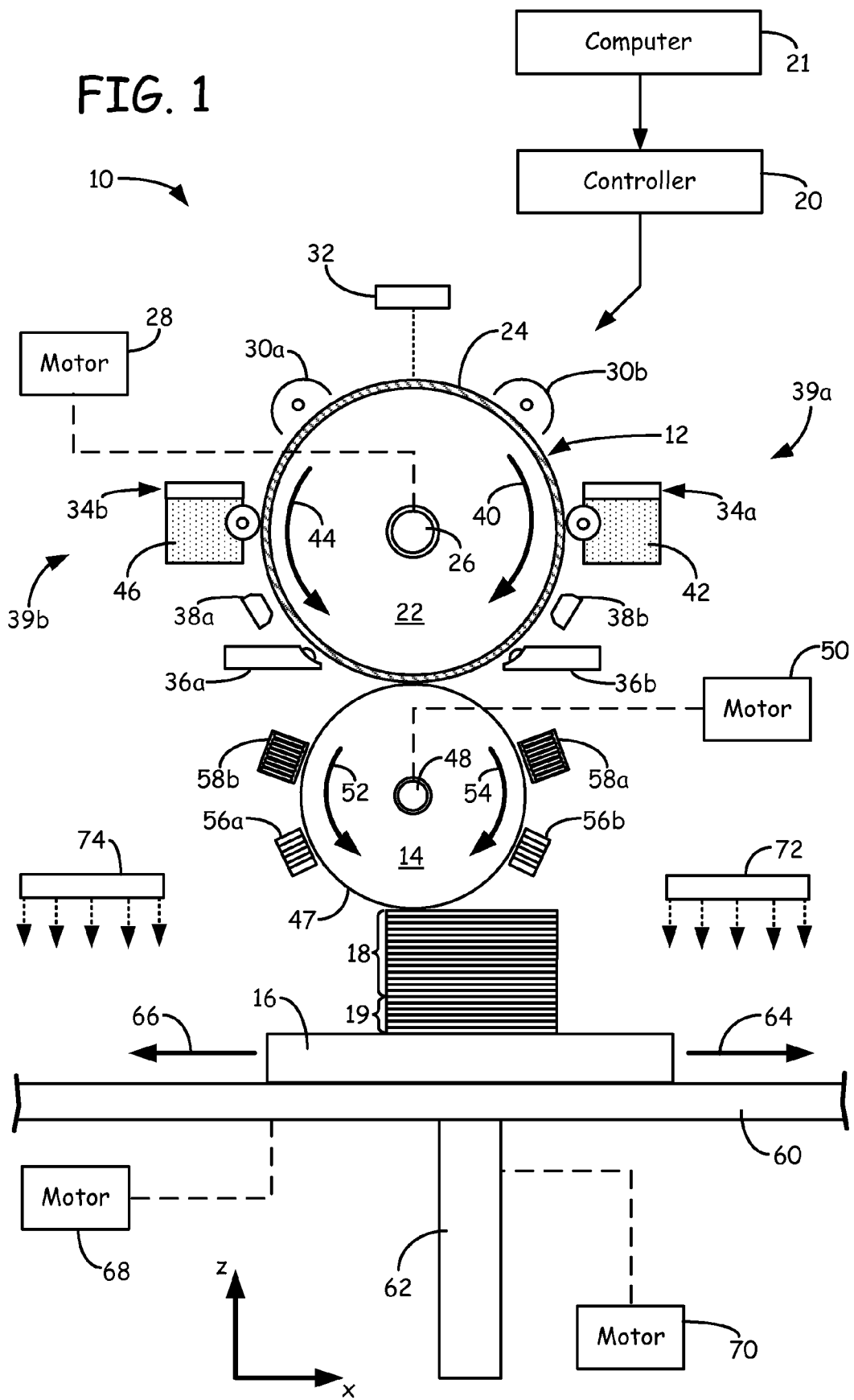

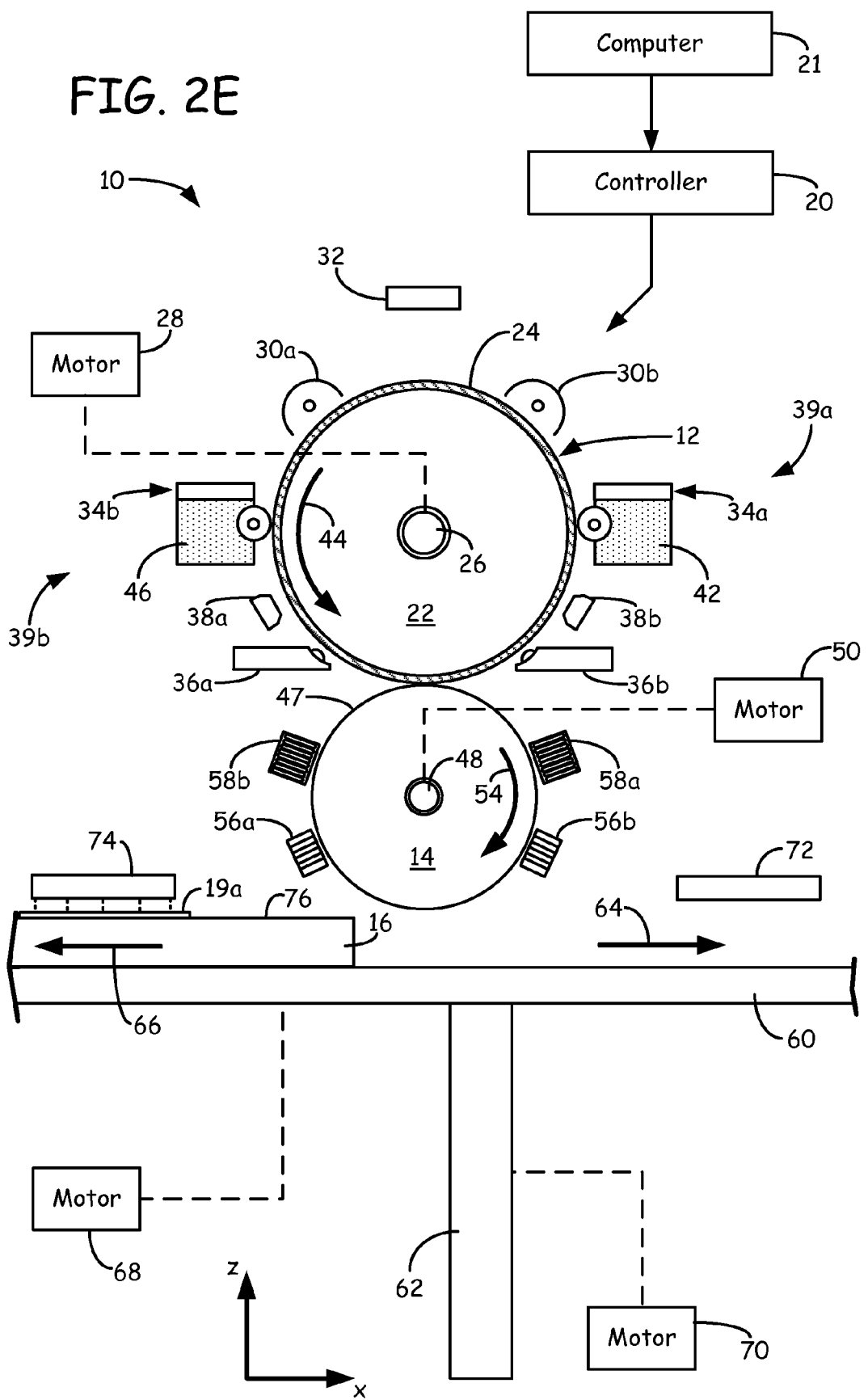

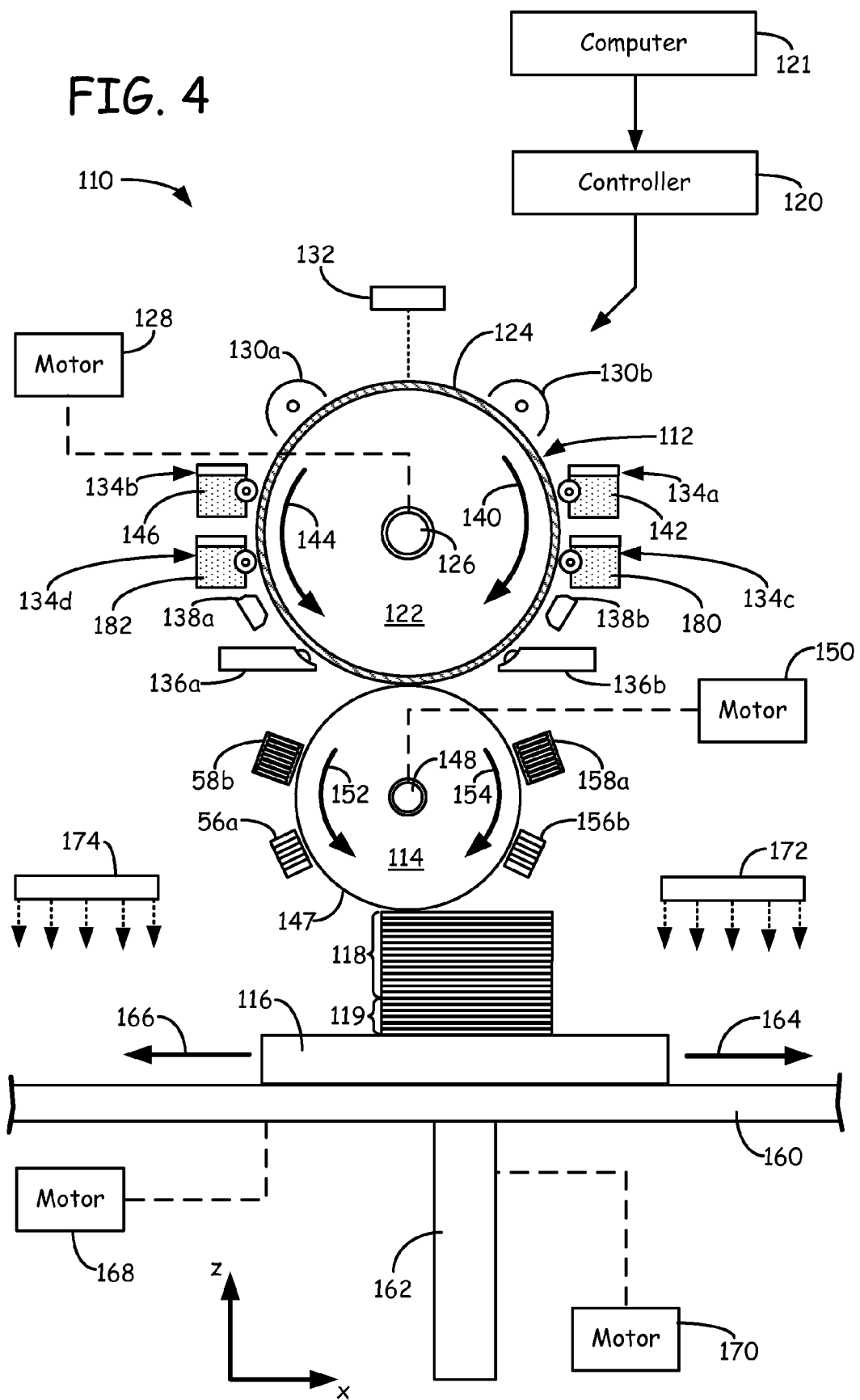

ELECTROPHOTOGRAPHY-BASED ADDITIVE MANUFACTURING SYSTEM WITH RECIPROCATING OPERATION

BACKGROUND

The present disclosure relates to additive manufacturing systems for building three-dimensional (3D) parts and support structures. In particular, the present disclosure relates to systems and processes for building 3D parts and support structures with electrophotography-based systems and/or ionography-based systems.

Additive manufacturing systems are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the modeling material during fabrication, and is removable from the completed 3D part when the printing process is complete.

In two-dimensional (2D) printing, electrophotography (i.e., xerography) is a popular technology for creating 2D images on planar substrates, such as printing paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

SUMMARY

An aspect of the present disclosure is directed to an additive manufacturing system for printing a 3D part using electrophotography. The system includes a rotatable photoconductor component having a surface, and a first development station and a second development station. The first development station is configured to develop a layer of a first material on the surface of the rotatable photoconductor component while the rotatable photoconductor component rotates in a first rotational direction. The second development station is configured to develop a layer of a second material on the surface of the rotatable photoconductor component while the rotatable photoconductor component rotates in a second rotational direction that is opposite of the first rotational direction. The system also includes a rotatable transfer component configured to receive the developed layers from the surface of the rotatable photoconductor component, and a platen configured to receive the developed layers from the rotatable transfer component in a layer-by-layer manner to print the 3D part from at least a portion of the received layers. The system further includes a controller configured to selectively rotate the rotatable photoconductor component in first and second rotational directions, to rotate the rotatable transfer component at a synchronized rate and in counter-rotation with the rotatable photoconductor component, and to move the platen at a synchronized rate with and in the direction of the rotation of the rotatable transfer component, and to index the platen along a z-axis between layers.

Another aspect of the present disclosure is directed to an additive manufacturing system for printing a 3D part using electrophotography, where the system includes a rotatable photoconductor component having a surface, and a plurality of development stations configured to develop layers of materials on the surface of the rotatable photoconductor component while the rotatable photoconductor component rotates in a first rotational direction. The system also includes a mechanism configured to interchangeably engage the plurality of development stations with the surface of the rotatable photoconductor component, and a platen configured to operably receive the developed layers in a layer-by-layer manner to print the 3D part from at least a portion of the received layers. The system further includes at least one second development station configured to develop layers of a second material on the surface of the rotatable photoconductor component while the rotatable photoconductor component rotates in the second rotational direction. The system further includes a controller configured to selectively rotate the rotatable photoconductor component in the opposing rotational directions, and to operate the mechanism to interchangeably engage the plurality of first development stations with the surface of the rotatable photoconductor component.

Another aspect of the present disclosure is directed to a method for printing a 3D part and support structure. The method includes rotating a rotatable photoconductor component in a first rotational direction, and developing a layer of the support structure from a first development station onto a surface of the rotatable photoconductor component while rotating in the first rotational direction. The method also includes transferring the developed layer of the support structure to a rotatable transfer component that rotates at a synchronized rate with the rotatable photoconductor component, and transferring the developed layer of the support structure from the rotatable transfer component to a platen. The method further includes rotating the rotatable photoconductor component in a second rotational direction that is opposite of the first rotational direction, and developing a layer of the 3D part from a second development station onto the surface of the rotatable photoconductor component while rotating in the second rotational direction. The method further includes transferring the developed layer of the 3D part to the rotatable transfer component, and transferring the developed layer of the 3D part from the rotatable transfer component onto the layer of the support structure previously transferred to the platen.

BRIEF DESCRIPTION OF THE DRAWINGS

FIG. 1 is a schematic illustration of an additive manufacturing system of the present disclosure for printing 3D parts and support structures using electrophotography.

FIGS. 2A-2L are schematic illustrations of the additive manufacturing system of the present disclosure, illustrating a printing operation to print a 3D part and support structure.

FIG. 4 is a schematic illustration of a first alternative additive manufacturing system of the present disclosure, which includes four development stations.

DETAILED DESCRIPTION

Figure 2A:
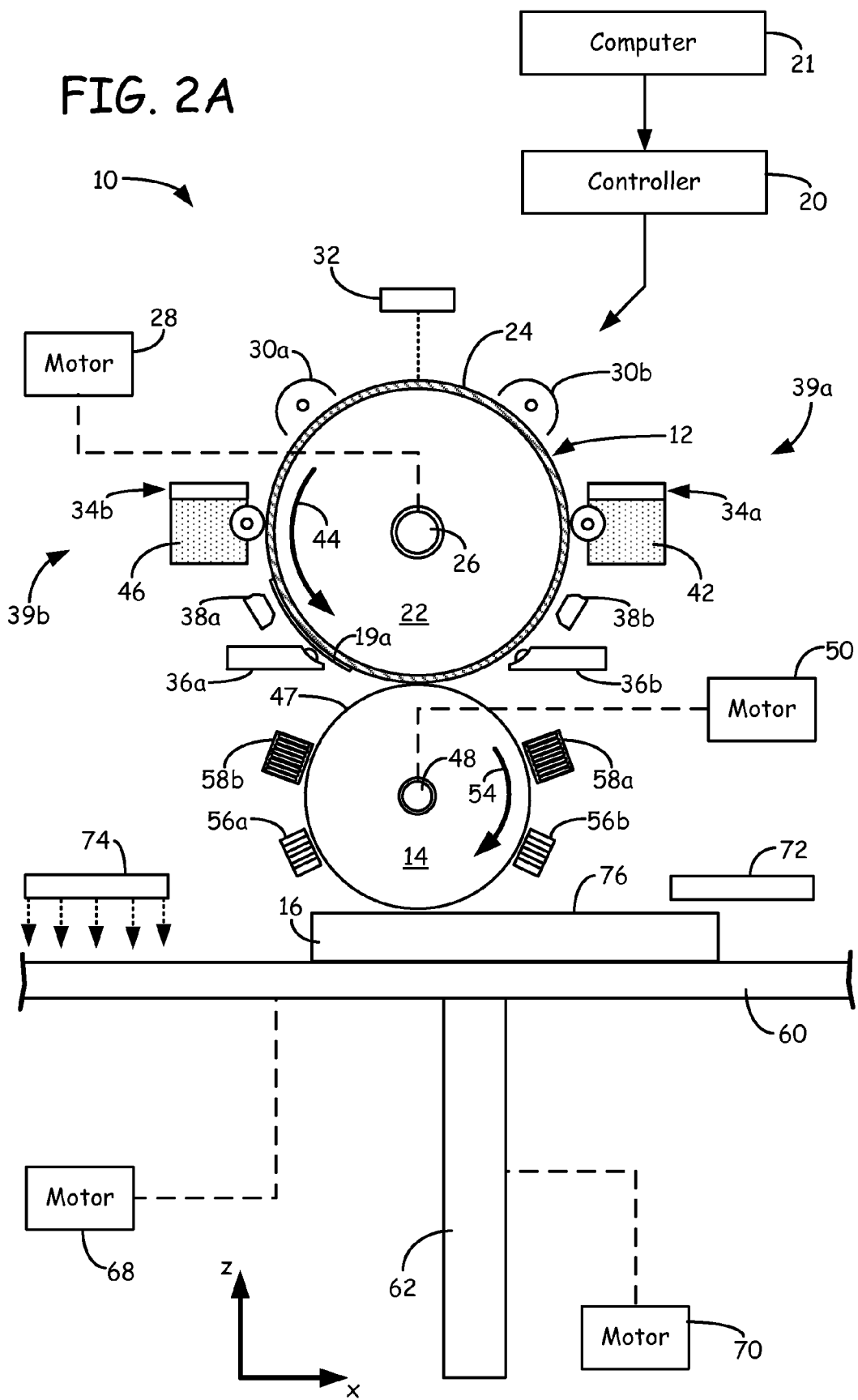

The present disclosure is directed to an additive manufacturing system for printing 3D parts and support structures using electrophotography. As discussed below, the system prints the 3D parts and support structures in a layer-by-layer manner with the use of a photoconductor, a transfer medium, and a platen, each of which are configured to move in a reciprocating or bi-directional manner. The reciprocating movements allow the system to have smaller dimensions, while also efficiently printing with multiple materials, such as multiple part and/or support materials, and colorants. The reciprocating movements also increase printing rates and registration accuracies compared to multiple-engine systems.

As shown in FIG. 1, system 10 includes photoconductor drum 12, transfer drum 14, and platen 16, each of which are configured to move in a reciprocating or bi-directional manner to print 3D part 18 and support structure 19 in a layer-by-layer manner. In the shown example, support structure 19 is the bottom-most layers of the printed stack to assist in the removal of 3D part 18 from platen 16 after the printing operation is complete. However, support structure 19 may be one or more structures printed to provide vertical support along the z-axis for overhanging regions of any of the layers of 3D part 18. This allows 3D part 18 to be printed with a variety of geometries.

While described herein as drums, one or both of photoconductor drum 12 and transfer drum 14 may alternatively be rollers, belt assemblies, or other rotatable assemblies. Furthermore, the components of system 10 are desirably retained within an enclosable housing (not shown) that prevents ambient light from being transmitted to the components of system 10 during operation.

System 10 also includes controller 20, which is one or more microprocessor-based engine control systems and/or digitally-controlled raster imaging processor systems, and which is configured to operate the components of system 10 in a synchronized manner based on printing instructions received from host computer 21. Host-computer 21 is one or more computer-based systems configured to communicate with controller 20 to provide the print instructions (and other operating information). For example, host computer 21 may transfer information to controller 20 that relates to the sliced layers of 3D part 18 and support structure 19, thereby allowing system 10 to print 3D part 18 and support structure 19 in a layer-by-layer manner.

Photoconductor drum 12 includes conductive drum 22 and photoconductive surface 24, where conductive drum 22 is an electrically-conductive drum (e.g., fabricated from copper, aluminum, tin, or the like) that is electrically grounded and configured to rotate in a reciprocating or bi-directional manner around shaft 26. Shaft 26 is correspondingly connected to drive motor 28, which is configured to rotate shaft 26 (and photoconductor drum 12) in opposing rotational directions in the direction of arrows 40 and 44 based on commands from controller 20.

Photoconductive surface 24 is a thin film extending around the circumferential surface of conductive drum 22, and is derived from one or more photoconductive materials, such as amorphous silicon, selenium, zinc oxide, organic materials, and the like. As discussed below, surface 24 is configured to receive latent-charged images of the sliced layers of 3D part 18 and support structure 19 (or negative images), and to attract charged particles of the part and support materials to the charged or discharged image areas, thereby creating the layers of 3D part 18 and support structure 19.

As further shown, system 10 also includes charge inducers 30a and 30b, imager 32, development stations 34a and 34b, cleaning stations 36a and 36b, and discharge devices 38a and 38b, each of which may be in signal communication with controller 20. Charge inducer 30a, imager 32, development station 34a, cleaning station 36a, and discharge device 38a define a first image-forming assembly 39a for surface 24. Correspondingly, charge inducer 30b, imager 32, development station 34b, cleaning station 36b, and discharge device 38b define a second image-forming assembly 39b for surface 24.

In the shown example, first image-forming assembly 39a is used to form a layer of a part material 42 for printing 3D part 18 (e.g., layer 18a, shown below in FIGS. 2G-2K), where a supply of part material 42 is retained by development station 34a, and drive motor 28 and shaft 26 rotate photoconductor drum 12 in the direction of arrow 40 (hereafter "first rotational direction"). Charge inducer 30a is configured to generate a uniform electrostatic charge on surface 24 as surface 24 rotates in the first rotational direction past charge inducer 30a. Suitable devices for charge inducer 30a include corotrons, scorotrons, charging rollers, and other electrostatic charging devices.

Imager 32 is a digitally-controlled, pixel-wise light exposure apparatus configured to selectively emit electromagnetic radiation toward the uniform electrostatic charge on surface 24 as surface 24 rotates in the direction of arrow 40 past imager 32. The selective exposure of the electromagnetic radiation to surface 24 is directed by controller 20, and causes discrete pixel-wise locations of the electrostatic charge to be removed (i.e., discharged to ground), thereby forming a latent image charge pattern on surface 24. Suitable devices for imager 32 include scanning laser (e.g., gas or solid state lasers) light sources, light emitting diode (LED) array exposure devices, and other exposure devices conventionally used in 2D electrophotography systems. In alternative embodiments, suitable devices for imager 32 and charge devices 30a and 30b include ion-deposition systems configured to selectively directly deposit charged ions or electrons to surface 24 to form the latent image charge pattern. As such, as used herein, the term "electrophotography" includes ionography.

Development station 34a is a first electrostatic and magnetic development station that retains the supply of part material 42 (or other suitable material) in powder form, and that applies a layer of part material 42 to surface 24. In particular, as surface 24 (containing the latent charged image) rotates in the first rotational direction from imager 32 to development station 34a, part material 42 is attracted to the appropriately charged or discharged regions of the latent image on surface 24, utilizing either charged area development or discharged area development (depending on the electrophotography mode being utilized).

Development station 34a may function in a similar manner to single or dual component development systems and toner cartridges used in 2D electrophotography systems. For example, development station 34a may include an enclosure for retaining the charged part material 42, and one or more devices for transferring the charged part material 42 to surface 24, such as conveyor, fur brushes, paddle wheels, rollers, and/or magnetic brushes. Suitable materials for part material 42 may vary depending on the desired part properties, such as one or more thermoplastic resins. Examples of suitable thermoplastic resins for part material 42 include polyolefins, polyester, nylon, toner materials (e.g., styrene-acrylate/acrylic materials), and combinations thereof. In dual-component arrangements, part material 42 may also include a carrier material with the thermoplastic resin(s). For example, the carrier material is magnetically permeable and appropriately coated with a material to triboelectrically charge the thermoplastic resin(s) of part material 42.

The resulting developed part layer of part material 42 (e.g., layer 18a, shown below in FIGS. 2G-2K) carried by surface 24 is rotated in the direction of arrow 40 to a transfer region in which the part layer is transferred from photoconductor drum 12 to transfer drum 14, as discussed below. After the part layer is transferred from photoconductor drum 12 to transfer drum 14, drive motor 28 and shaft 26 continue to rotate photoconductor drum 12 in the first rotational direction such that the region of surface 24 that previously held the part layer passes cleaning station 36a. Cleaning station 36a is a station configured to remove any residual, non-transferred portions of part material 42. Suitable devices for cleaning station 36a include blade cleaners, brush cleaners, electrostatic cleaners, vacuum-based cleaners, and combinations thereof.

After passing cleaning station 36a, surface 24 continues its rotation such that the cleaned regions of surface 24 pass discharge device 38a to remove any residual electrostatic charge on surface 24. Suitable devices for discharge device 38a include optical systems, high-voltage alternating-current corotrons and/or scorotrons, one or more rotating dielectric rollers having conductive cores with applied high-voltage alternating-current, and combinations thereof.

As shown, while surface 24 is rotated in the first rotational direction, controller 20 desirably deactivates or disengages charge inducer 30b, cleaning station 36b, and discharge device 38b. This prevents these components from interfering with the formation, development, and transfer of the part layer. In one embodiment, controller 20 may also disengage development station 34b. However, as shown in FIG. 1, development station 34b is disposed downstream in the first rotational direction of arrow 40 from discharge device 38a, and upstream from charge inducer 30a. As such, a region of surface 24 that passes development station 34b while rotating in the first rotational direction is uncharged, thereby preventing charged particles from development station 34b from being attracted to surface 24.

In the shown embodiment, the second image-forming assembly 39b for surface 24 is used to form a layer of a support material 46 (e.g., layer 19a, shown below in FIGS. 2A-2E) for printing support structure 19, where a supply of support material 46 is retained by development station 34b, and drive motor 28 and shaft 26 rotate photoconductor drum 12 in the direction of arrow 44 (hereafter "second rotational direction"). Charge inducer 30b is configured to generate a uniform electrostatic charge on surface 24 as surface 24 rotates in the second rotational direction past charge inducer 30b. Suitable devices for charge inducer 30b include those discussed above for charge inducer 30a.

Imager 32 operates in the second image-forming assembly 39b in the same manner as described above in regards to the first image-forming assembly 39b. In this operation, imager 32 selectively emits electromagnetic radiation toward the uniform electrostatic charge on surface 24 as surface 24 rotates in the second rotational direction past imager 32. This selective exposure of the electromagnetic radiation to surface 24 is directed by controller 20, and causes discrete pixel-wise locations of the electrostatic charge to be removed (i.e., discharged to ground), thereby forming a second latent image charge pattern on surface 24.

Development station 34b is a second electrostatic and magnetic development station that retains the supply of a support material 46 (or other suitable material) in powder form, and applies a layer of support material 46 to surface 24. In particular, as surface 24 (containing the second latent image) rotates from imager 32 to development station 34b in the second rotational direction, support material 44 is attracted to the appropriately charged or discharged regions of the latent image on surface 24, utilizing either charged area development or discharged area development (depending on the electrophotography mode being utilized).

Development station 34b may function in a similar manner to single or dual component development systems and toner cartridges used in 2D electrophotography systems, as described above regarding development station 34a. Suitable materials for support material 46 may vary depending on the desired support structure properties, such as one or more thermoplastic resins that are compatible with part material 42 and that may be separated from 3D part 18 after the printing operation is complete (e.g., different solubilities, different melting temperatures, and the like). In dual-component arrangements, support material 46 may also include a carrier material with the thermoplastic resin(s). For example, the carrier material is magnetically permeable and appropriately coated with a material to triboelectrically charge the thermoplastic resin(s) of part material 46. In an alternative example, the carrier material may be coated with the thermoplastic resin(s) of support material 46.

The resulting developed support layer of support material 46 (e.g., layer 19a, shown below in FIGS. 2A-2E) is rotated with surface 24 in the second rotational direction to the transfer region in which the support layer is transferred from photoconductor drum 12 to transfer drum 14, as discussed below. After the support layer is transferred from photoconductor drum 12 to transfer drum 14, drive motor 28 and shaft 26 continue to rotate photoconductor drum 12 in the second rotational direction such that the region of surface 24 that previously held the support layer passes cleaning station 36b. Cleaning station 36b is a station configured to remove any residual, non-transferred portions of support material 46. Suitable devices for cleaning station 36b include those discussed above for cleaning station 36a.

After passing cleaning station 36b, surface 24 continues to rotate in the second rotational direction such that the cleaned regions of surface 24 pass discharge device 38b to remove any residual electrostatic charge on surface 24. Suitable devices for discharge device 38b include those discussed above for discharge device 38a.

In this operation, while surface 24 is rotated in the second rotational direction, controller 20 desirably deactivates or disengages charge inducer 30a, cleaning station 36a, and discharge device 38a. This prevents these components from interfering with the formation, development, and transfer of the support layer. In one embodiment, controller 20 may also disengage development station 34a. However, as shown in FIG. 1, development station 34a is disposed downstream in the second rotational direction of arrow 44 from discharge device 38b, and upstream from charge inducer 30b. As such, a region of surface 24 that passes development station 34a while rotating in the second rotational direction is uncharged, thereby preventing charged particles from development station 34a from being attracted to surface 24.

Transfer drum 14 is a second electrically-conductive drum (e.g., fabricated from copper, aluminum, tin, or the like) that is electrically grounded, and includes circumferential surface 47. The layers of part material 42 and support material 46 may be transferred from photoconductor drum 12 to surface 47 of transfer drum 14 using one or more of electrostatic forces, temperature, and pressure. For example, transfer drum 14 may be temperature-controlled, as described below, and may also be electrically biased with a potential having a magnitude and sign that electrostatically attracts the layers of part material 42 and support material 46 from photoconductor drum 12 at the transfer region.

Surface 47 may include a layer of one or more appropriately selected surface energy materials optimized to effectively receive the transferred layers from surface 24 and also to completely transfer the received layers of part material 42 and support material 46 to platen 16. Examples of suitable materials for surface 47 include fluorinated polymers, such as polytetrafluoroethylenes (PTFE), fluorinated ethylene propylenes, and perfluoroalkoxy polymers. Examples of suitable commercially available fluorinated polymers include PTFE available under the trade designation "TEFLON" from E.I. du Pont de Nemours and Company, Wilmington, Del.

Transfer drum 14 is configured to rotate in a reciprocating or bi-directional manner around shaft 48. Shaft 48 is correspondingly connected to drive motor 50, which is configured to rotate shaft 48 (and transfer drum 14) in opposing rotational directions based on commands from controller 20. For example, when controller 20 directs motor 28 to rotate photoconductor drum 12 in the first rotational direction of arrow 40 to form a layer of part material 42, controller 20 also directs motor 50 to rotate transfer drum 14 in the direction of arrow 52 at a synchronized rate with, and counter to, the rotation of photoconductor drum 12 in the direction of arrow 40. As shown, the rotational directions of arrows 40 and 52 are opposite, which prevents frictional sliding at the transfer region between photoconductor drum 12 and transfer drum 14.

Likewise, when controller 20 directs motor 28 to rotate photoconductor drum 12 in the second rotational direction of arrow 44 to form a layer of support material 46, controller 20 also directs motor 50 to rotate transfer drum 14 in the direction of arrow 54. The rotation of transfer drum 14 in the direction of arrow 54 is also desirably performed at a synchronized rate with, and counter to, the rotation of photoconductor drum 12 in the direction of arrow 44, where the rotational directions of arrows 44 and 54 are also opposite to prevent frictional sliding at the transfer region.

System 10 also includes heaters 56a and 56b and cooling units 58a and 58b, disposed around the circumference of transfer drum 14. Heaters 56a and 56b are heating elements configured to heat the transferred layers of part material 42 and support material 44, thereby rendering the heated layers tacky. After being heated, the resulting tacky layers may be transferred to platen 16 or to previously formed layers of 3D part 18 and/or support structure 19, as discussed below. Cooling units 58a and 58b are configured to lower the temperature of surface 47 after the given layers of part material 42 or support material 46 have been transferred to platen 16, and prior to receiving a subsequent layer from photoconductor drum 12.

Controller 20 operates heater 56a and cooling unit 58a in coordination with the formation of the layers of part material 42, and operates heater 56b and cooling unit 58b in coordination with the formation of the layers of support material 46. For example, while transfer drum 14 is rotated in the direction of arrow 52, controller 20 directs heater 56a to operate to tackify the received layer of part material 42. The heated layer is then transferred from surface 47 of transfer drum 14 to platen 16 (or to a previously formed layer of 3D part 18 and/or support structure 19). The continued rotation of transfer drum 14 in the direction of arrow 52 allows surface 47 of transfer drum 14 to pass cooling unit 58a to cool surface 47.

Alternatively, while transfer drum 14 is rotated in the direction of arrow 54, controller 20 directs heater 56b to operate to tackify the received layer of support material 46. The heated layer is then transferred from transfer drum 14 to platen 16 (or to a previously formed layer of 3D part 18 and/or support structure 19). The continued rotation of transfer drum 14 in the direction of arrow 54 allows surface 47 of transfer drum 14 to pass cooling unit 58b to cool surface 47 down.

Platen 16 is a platform assembly of system 10 that is configured to receive the layers of part material 42 and/or support material 46 for printing 3D part 18 and/or support structure 19 in a layer-by-layer manner. Platen 16 is supported by x-axis gantry 60 and z-axis gantry 62. X-axis gantry 60 is a first linear guide mechanism configured to move platen 16 along the horizontal x-axis in reciprocating directions, referred to by arrows 64 and 66. The movement of platen 16 with x-axis gantry 60 is operated by drive motor 68 based on commands from controller 20. In the shown embodiment, x-axis gantry 60 moves platen 16 in the reciprocating directions with back-and-forth motions along the x-axis. In alternative embodiments, x-axis gantry 60 (and, optionally, z-axis gantry 62) may move platen 16 in the reciprocating directions with loop motions and/or pivoting motions (e.g., with a gimbal design).

Z-axis gantry 62 is a second linear guide mechanism configured to move platen 16 and x-axis gantry 60 along the vertical z-axis to adjust the elevation of platen 16 relative to transfer drum 14. The movement of platen 16 and x-axis gantry 60 with z-axis gantry 62 is operated by z-axis motor 70 based on commands from controller 20.

System 10 also includes fixing elements 72 and 74, which are heating devices configured to heat the formed layers of 3D part 18 and support structure 19, as discussed below. Suitable devices for fixing elements 72 and 74 include non-contact radiant heaters, convection heating devices, contact heating devices (e.g., heated rollers and/or platens), and the like. Fixing elements 72 and 74 may also be variable heat devices, and they may also be configured as pressure plates, for fusing together the printed material.

The reciprocating movements of the components of system 10 may vary depending on the particular layers being developed and printed. FIGS. 2A-2L illustrate an example printing operation to print 3D part 18 and support structure 19 with system 10, where multiple layers of support structure 19 are initially printed, followed by the printing of multiple layers of 3D part 18. In comparison, as discussed below, FIGS. 3A-3L illustrate an example printing operation to print 3D part 18 and support structure 19 with system 10, where the layers of part and support materials are printed in a co-planar or alternating manner, such as when the layers of 3D part 18 and support structure 19 are printed in the same increments, or as alternating successive layers.

When printing multiple successive layers of support material 46 without switching to part material 42 (e.g., as shown below in FIGS. 2A-2F), photoconductor drum 12 may continue to rotate in the second rotational direction of arrow 44 over multiple revolutions. This allows multiple development cycles to be performed for developing and transferring the successive layers of support material 46. Transfer drum 14 correspondingly rotates in the direction of arrow 54 over multiple revolutions at a rate that is synchronized with the rotation of photoconductor drum 12. Similarly, platen 16 moves in the directions of arrows 64 and 66 at a synchronized rate with the rotation of transfer drum 14.

As used herein, the term "development cycle" refers to a cycle to develop a layer of a material with a photoconductor drum (e.g., photoconductor drum 12), and to transfer the developed layer from the photoconductor drum (e.g., to transfer drum 14), regardless of the rotational direction of the photoconductor drum. For example, a development cycle may be performed to print a layer of support material 46 by rotating photoconductor drum 12 in the second rotational direction such that a portion of surface 24 passes charge inducer 30*b*, imager 32, development station 34*b*, and transfer drum 14, thereby developing and transferring a layer of support material 46. Optionally, the term "development cycle" may also include one or more steps for cleaning and/or discharging the surface of the photoconductor drum (e.g., surface 24 with cleaning station 36*b* and discharge device 38*b*).

Similarly, when printing multiple successive layers of part material 42 without switching to support material 46 (e.g., as shown below in FIGS. 2G-2L), photoconductor drum 12 may continue to rotate in the first rotational direction of arrow 40 over multiple revolutions. This allows multiple development cycles to be performed for developing and transferring the successive layers of part material 42. Transfer drum 14 correspondingly rotates in the direction of arrow 52 over multiple revolutions at a rate that is synchronized with the rotation of photoconductor drum 12. Similarly, platen 16 moves in the directions of arrows 64 and 66 at a synchronized rate with the rotation of transfer drum 14.

As shown in FIG. 2A, during the operation to print 3D part 18 and support structure 19, controller 20 directs z-axis motor 70 and z-axis gantry 60 to position platen 16 at a suitable height along the z-axis such that a top surface of platen 16 (referred to as top surface 76) is disposed below and adjacent to surface 47 of transfer drum 14. If the height of platen 16 is too low relative to transfer drum 14, then the layer of part material 42 or support material 46 will not be able to transfer from transfer drum 14 to top surface 76. Alternatively, if the height of platen 16 too high relative to transfer drum 14, the transferred layers may be squeezed between transfer drum 14 and platen 16, thereby potentially damaging 3D part 18 and support structure 19. As such, controller 20 desirably positions platen 16 at the suitable height to effectively transfer the layer(s) of part material 42 and/or support material 46 from transfer drum 14 to top surface 76.

Additional factors that may affect the transfer of the developed layers of part and support materials from transfer drum 14 to the top layer of the stack of 3D part 18 and support structure 19 include the temperature of the layer being transferred (e.g., how tacky the material is), the contact duration between the transferred layer and the top layer of the stack, the adhesive properties of the part and support materials, and the like. In one embodiment, system 10 operates with one or more feedback process control loops to monitor the pressures between transfer drum 14 and platen 16 and/or the temperatures of the layers of part material 42 and support material 46. Examples of suitable techniques for such feedback process control loops, and a suitable transfusion technique for transferring the developer layers, are disclosed in co-filed U.S. Provisional Patent Application No. 61/538,491 entitled "Layer Transfusion For Electrophotography-Based Additive Manufacturing", the contents of which are incorporated by reference. This provides a variable temperature and pressure control to transfer the layers from transfer drum 14 to platen 16.

As discussed above, system 10 may initially form one or more layers of support structure 19 on top surface 76 to assist in the removal of 3D part 18 from platen 16 after the printing operation is complete. When forming a layer of support material 46, controller 20 may direct photoconductor drum 12 and transfer drum 14 to rotate in the directions of arrows 44 and 54, respectively. At this point in the process, controller 20 also desirably disables or disengages charge inducer 30*a*, cleaning station 36*a*, discharge device 38*a*, (and optionally development station 34*a*) to prevent them from interfering with the formation of the layer of support material 46.

Photoconductor drum 12 desirably rotates in the second rotational direction at a predetermined operating rotational rate, which may depend on several factors such as the diameter of photoconductor drum 12, the desired printing rate of system 10, the speed of the development cycle with second image-forming assembly 39*b*, the cross-sectional dimensions of the developed layers, maximum platen/part length, and the like. The operating rotational rate is also dictated by the achievable rate of movement for platen 16. X-axis gantry 60 desirably moves platen 16 back-and-forth in the directions of arrows 64 and 66 once per printed layer. For an average printing rate of 50 layers per minute (i.e., about 1.2 seconds per layer), platen 16 moves back-and-forth between transfer drum 14 and fixing element 74 about every 1.2 seconds.

X-axis gantry 60 may move platen 16 back-and-forth at different rates, where platen 16 is moved at a first rate when engaged with transfer drum 14 (i.e., a rate that is synchronized with the rotational rate of transfer drum 14), and at a second faster rate when moving back-and-forth between transfer drum 14 and fixing element 74. Assuming, for example, that the movement back-and-forth between transfer drum 14 and fixing element 74 accounts for about 50% of the 1.2 seconds (i.e., for about 0.6 seconds), platen 16 is then engaged with transfer drum 14 for about 0.6 seconds. This corresponds to the maximum development cycle time for developing each layer of support material 46 with photoconductor drum 12.

When performing a single development cycle per revolution of photoconductor drum 12 (i.e., developing and transferring a single layer of support material 46 per revolution) at the maximum development cycle time of 0.6 seconds, the operating rotational rate for photoconductor drum 12 is about 0.6 seconds per revolution. However, when performing multiple development cycles per revolution of photoconductor drum 12 (i.e., developing and transferring multiple layers of support material 46 per revolution), the operating rotational rate for photoconductor drum 12 may be decreased. For example, when performing two development cycles per revolution of photoconductor drum 12 at the maximum development cycle time of 0.6 seconds, the operating rotational rate for photoconductor drum 12 is about 1.2 seconds per revolution; and when performing four development cycles per revolution photoconductor drum 12 at the maximum development cycle time of 0.6 seconds, the operating rotational rate for photoconductor drum 12 is about 2.4 seconds per revolution.

As photoconductor drum 12 rotates in the second rotational direction at the operating rotational rate, controller 20 directs charge inducer 30b to generate a uniform electrostatic charge on surface 24. Controller 20 then directs imager 32 to selectively expose surface 24 to electromagnetic radiation to form a latent image charge pattern on surface 24 corresponding to the dimensions of the layer of support material 46 (or a corresponding negative image).

As photoconductor drum 12 continues to rotate in the second rotational direction (bypassing the deactivated or disengaged charge inducer 30a), charged particles of support material 46 from development station 34b are attracted to the appropriately charged or discharged regions of the latent image on surface 24. This forms layer 19a of support material 46 on surface 24.

Figure 2B:
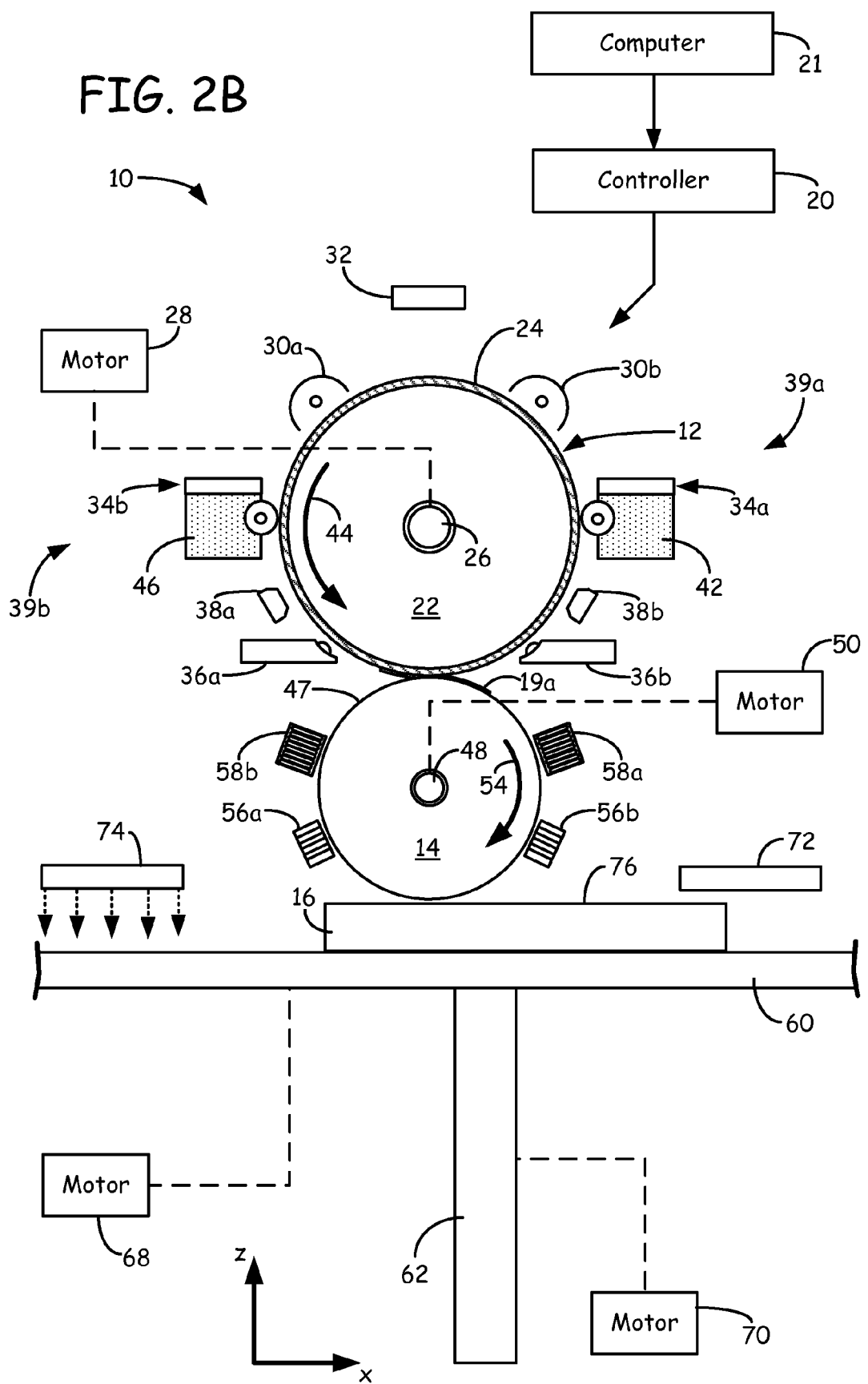

As photoconductor drum 12 continues to rotate in the second rotational direction (bypassing the deactivated or disengaged discharge device 38a and cleaning station 36a), the charged particles of layer 19a are attracted to surface 47 of transfer drum 14. As shown in FIG. 2B, this transfers layer 19a from photoconductor drum 12 to transfer drum 14 while transfer drum 14 rotates in the direction of arrow 54 at a rate that is synchronized with the operating rotational rate of photoconductor drum 12.

The synchronized rotational rate of transfer drum 14 depends on the operating rotational rate of photoconductor drum 12, and on the relative diameters between photoconductor drum 12 and transfer drum 14. For photoconductor drum 12 having an average diameter of about 6.0 inches and transfer drum 14 having an average diameter of 4.0 inches, and the operating rotational rate of photoconductor drum 12 is about 2.4 seconds per revolution, the synchronized rotational rate for transfer drum 14 is about 1.6 seconds per revolution.

Figure 2C:
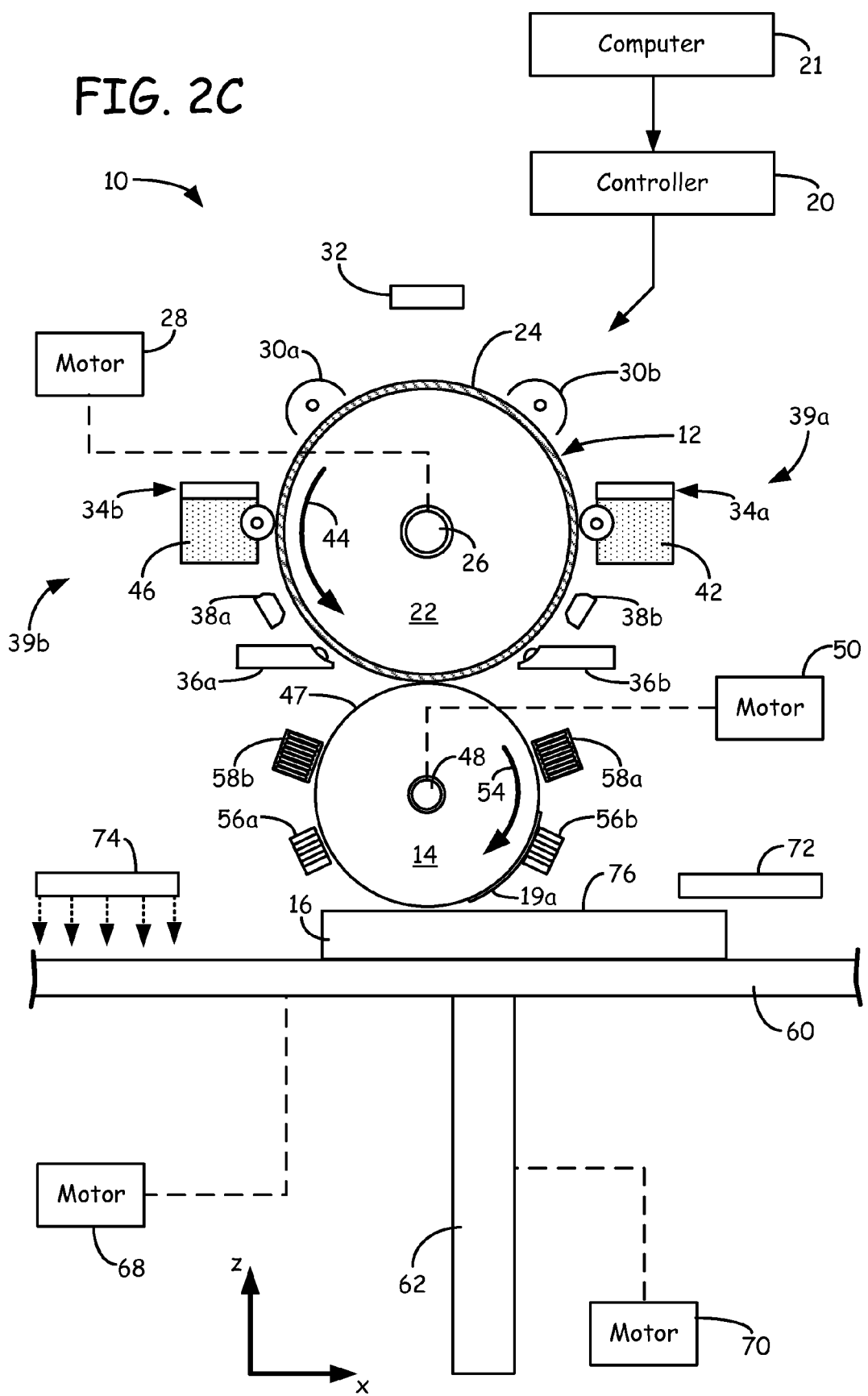
Figure 2D:
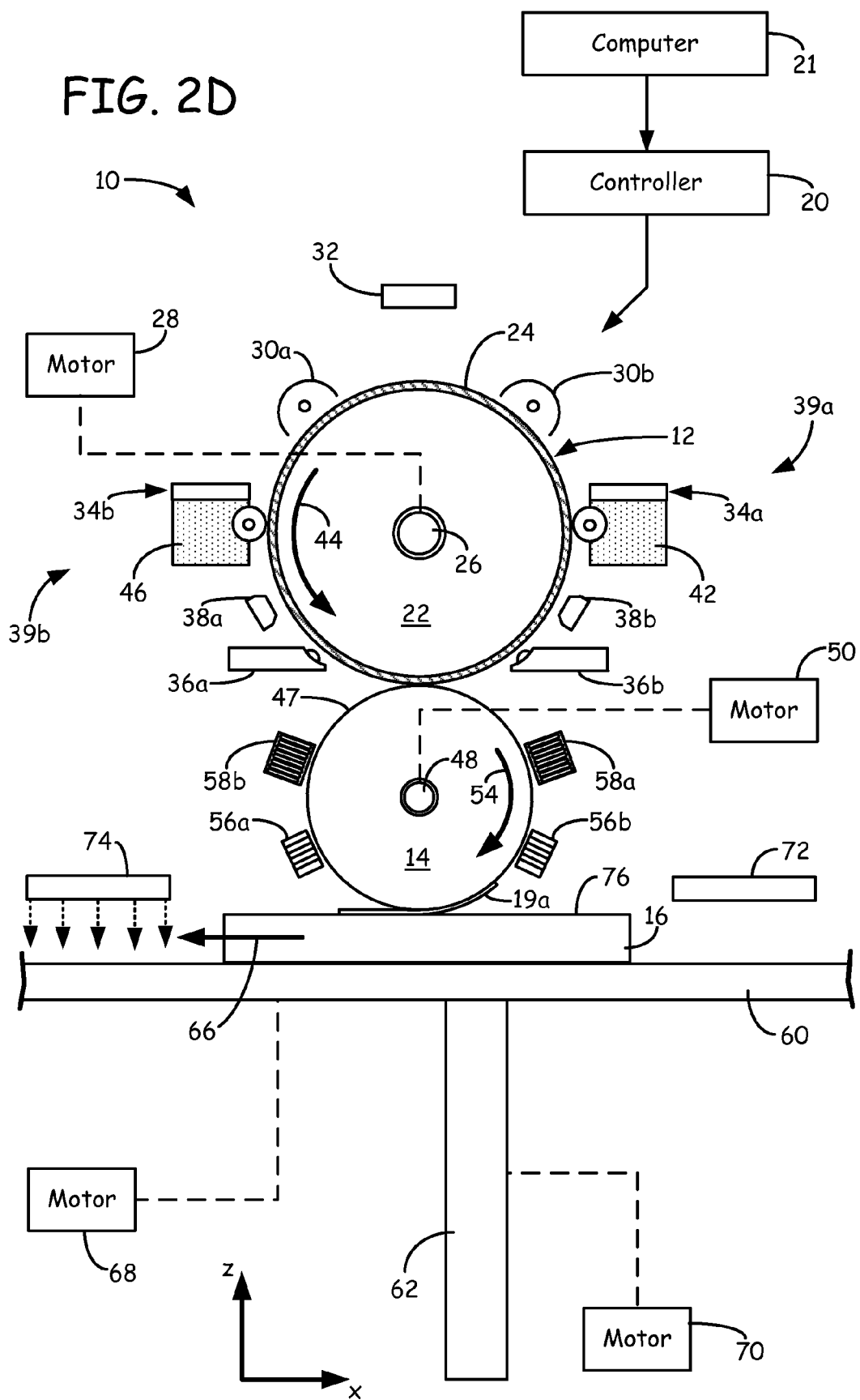

As shown in FIG. 2C, upon being transferred to surface 47, layer 19a is then heated to a tacky state with heating element 56b. As transfer drum 14 continues to rotate in the direction of arrow 54, layer 19a reaches a second transfer region at top surface 76 of platen 16. As shown in FIG. 2D, controller 20 directs motor 68 to and platen 16 in the direction of arrow 66 via x-axis gantry 60, at a rate that is synchronized with the rotational rate of transfer drum 14 in the direction of arrow 54. This prevents frictional resistance from being generated therebetween, allowing layer 19a to be transferred from surface 47 and laminated onto top surface 76 of platen 16 with accurate placement.

As shown in FIG. 2E, as platen 16 and the received layer 19a continue to move in the direction of arrow 66, layer 19a is exposed to fixing element 74, which further heats layer 19a to assist in securing layer 19a to top surface 76 of platen 16. After layer 19a is printed and heated, controller 20 may then direct z-axis motor 70 to appropriately move and reposition platen 16 and layer 19a via z-axis gantry 60. Controller may also direct motor 68 to move platen 16 and layer 19a in the direction of arrow 64 via x-axis gantry 60 to reset the placement of platen 16 and layer 19a for printing subsequent layers of support structure 19 on top of layer 19a.

As mentioned above, the synchronized movement rate of platen 16 depends on the rotational rate of transfer drum 14. Following the above-discussed example in which transfer drum 14 has a diameter of about 4.0 inches and rotates at a rotational rate of about 1.6 seconds per revolution, this corresponds to a movement rate for the circumference of surface 47 of transfer drum 14 of about 7.9 inches per second. Platen 16, therefore, also moves at about 7.9 inches per second to remain synchronized with transfer drum 14. Since platen 16 may be engaged with transfer drum 14 for about 0.6 seconds to transfer layer 19a from transfer drum 19 to platen 16 with the synchronized movement, a movement rate of 7.9 inches per second corresponds to a maximum layer size along the x-axis of about 4.7 inches.

Figure 2F:
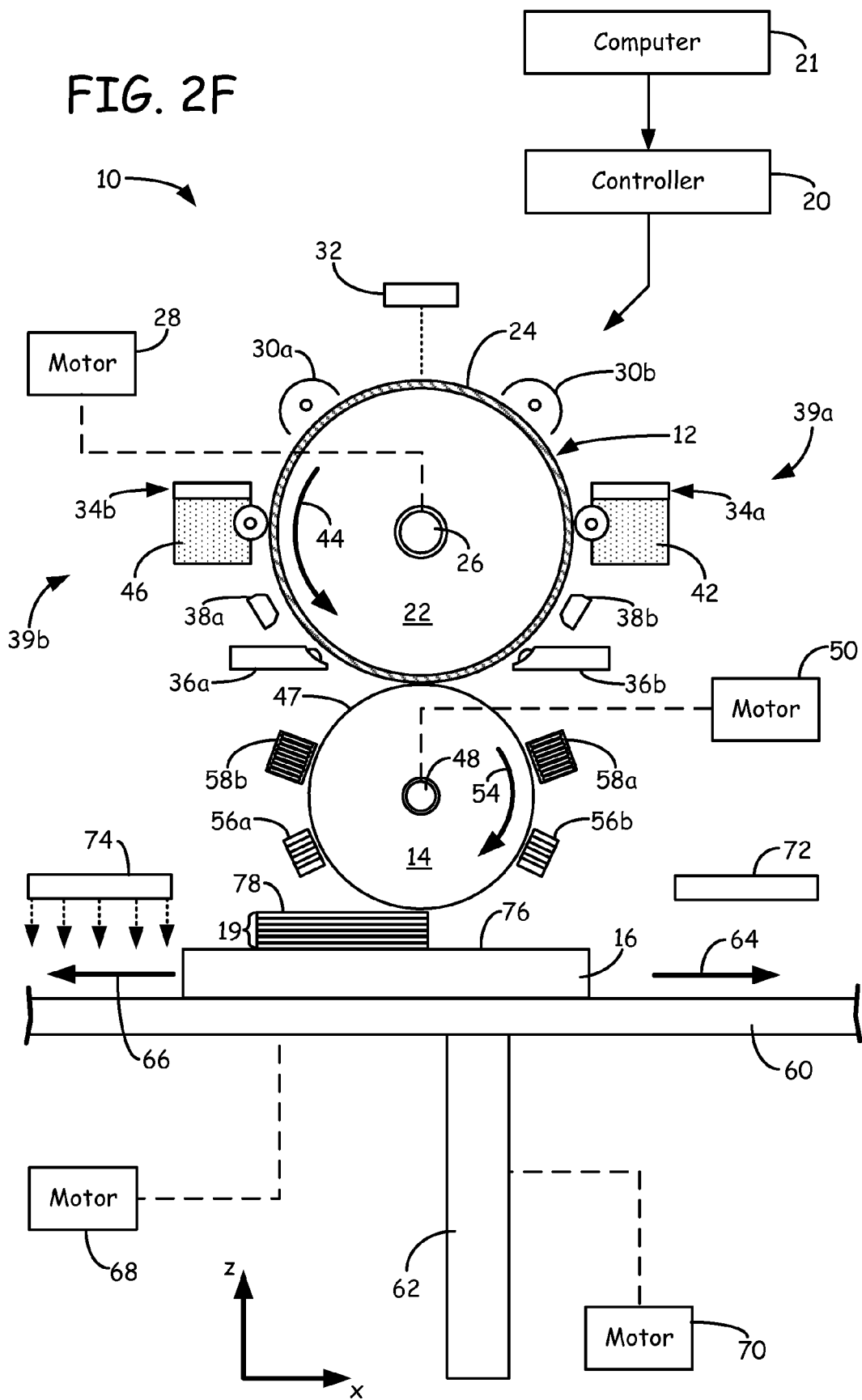

As shown in FIG. 2F, the above-discussed process may be repeated to print each successive layer of support structure 19 in a continuous manner by rotating photoconductor drum 12 and transfer drum 14 in the directions of arrows 44 and 54, respectively. For each printed layer, platen 16 is also desirably moved in the direction of arrow 66 to expose the printed layers of support structure 19 to fixing element 74, and then lowered a single increment along the z-axis.

When system 10 has completed the given layers of support structure 19, and is ready to print layers of 3D part 18, controller 20 may direct motor 68 to position platen 16 such that the top surface of support structure 19 (referred to as top surface 78) is set at a start location along the x-axis, as shown. This start position allows top surface 78 of support structure 19 to receive layers of part material 42 while transfer drum 14 subsequently rotates in the direction of arrow 40 and platen 16 subsequently moves in the direction of arrow 64.

When switching from support material 46 to part material 42, drive motor 28 slows photoconductor drum 12 down from the operating rotational rate in the second rotational direction to a zero rotation state. Drive motor 28 then rotates photoconductor drum 12 in the first rotational direction of arrow 40 (i.e., opposite of the second rotational direction of arrow 44), from the zero rotational state to the operating rotational rate.

Figure 2G:
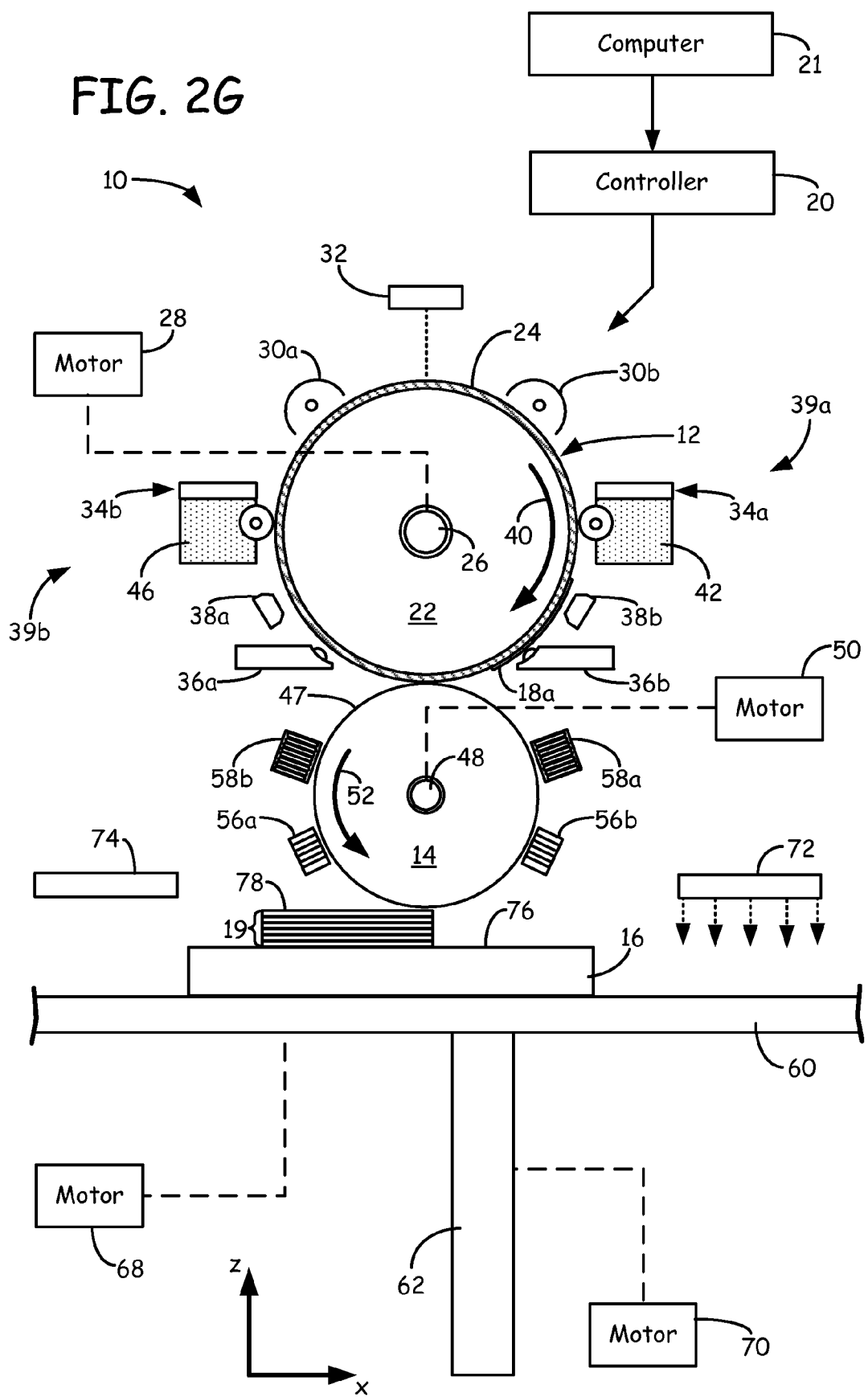

As shown in FIG. 2G, when forming a layer of part material 42 on top surface 78 of support structure 19, controller 20 may direct photoconductor drum 12 and transfer drum 14 to rotate in the directions of arrows 40 and 52, respectively. At this time in the process, controller 20 also desirably deactivates or disengages charge inducer 30b, cleaning station 36b, discharge device 38b, (and optionally development station 34b) to prevent them from interfering with the formation of the layer of part material 42.

As photoconductor drum 12 rotates in the first rotational direction at the operating rotational rate, controller 20 directs charge inducer 30a to generate a uniform electrostatic charge on surface 24. Controller 20 then directs imager 32 to selectively expose surface 24 to electromagnetic radiation to form a latent image charge pattern on surface 24 corresponding to the dimensions of the layer of part material 42 (or a corresponding negative image).

As photoconductor drum 12 continues to rotate in the first rotational direction (bypassing the deactivated or disengaged charge inducer 30b), charged particles of part material 42 from development station 34a are attracted to the appropriately charged or discharged regions of the latent image on surface 24. This forms layer 18a of part material 42 on surface 24.

Figure 2H:
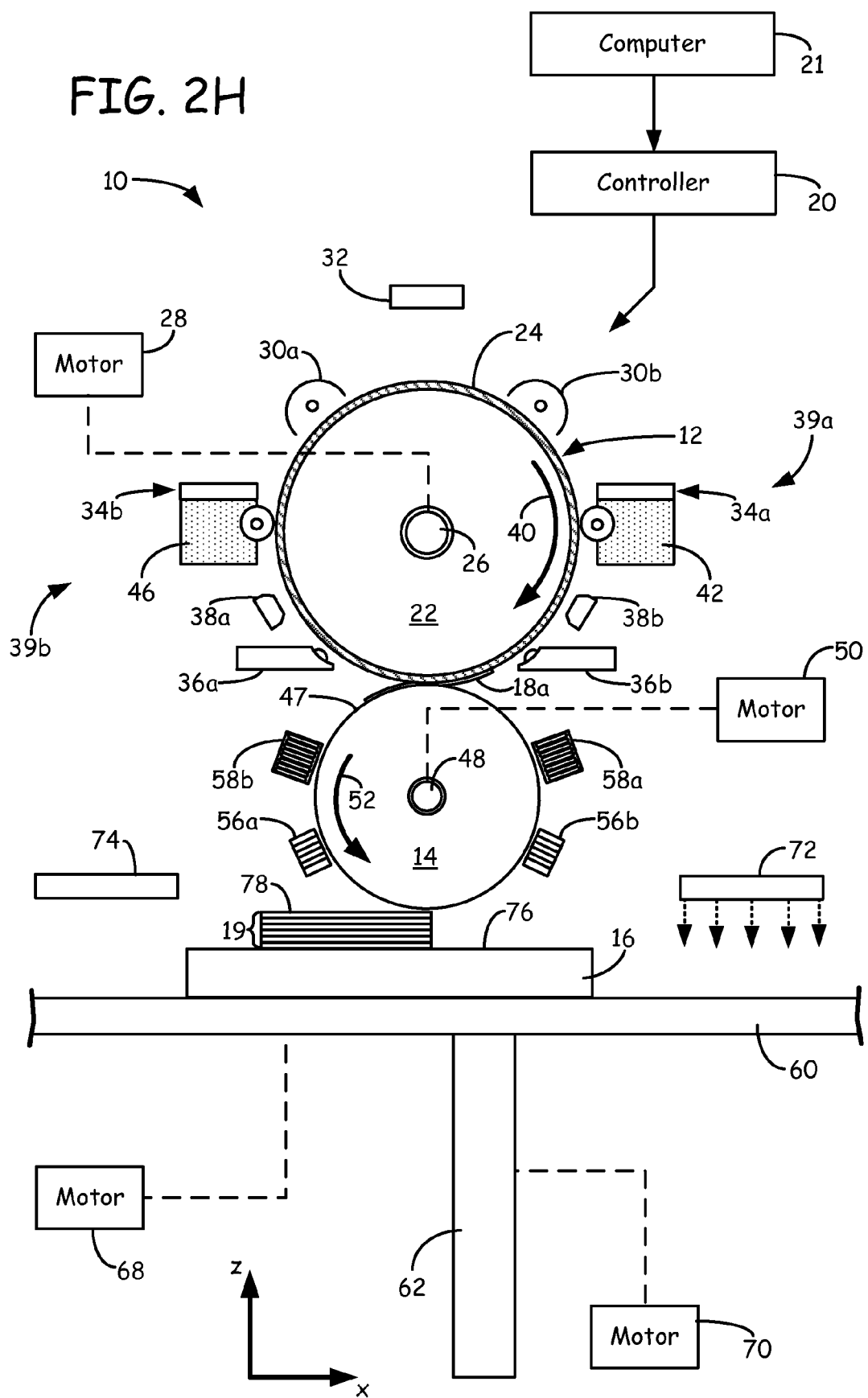

As photoconductor drum 12 continues to rotate in the first rotational direction (bypassing the deactivated or disengaged discharge device 38b and cleaning station 36b), the charged particles of layer 18a are attracted to surface 47 of transfer drum 14. As shown in FIG. 2H, this transfers layer 18a from photoconductor drum 12 to transfer drum 14 while transfer drum 14 rotates in the direction of arrow 52 at a rate that is synchronized with the operating rotational rate of photoconductor drum 12. The synchronized rotational rate of transfer drum 14 in the direction of arrow 52 also depends on the operating rotational rate of photoconductor drum 12, and on the relative diameters between photoconductor drum 12 and transfer drum 14, as discussed above.

Figure 2I:
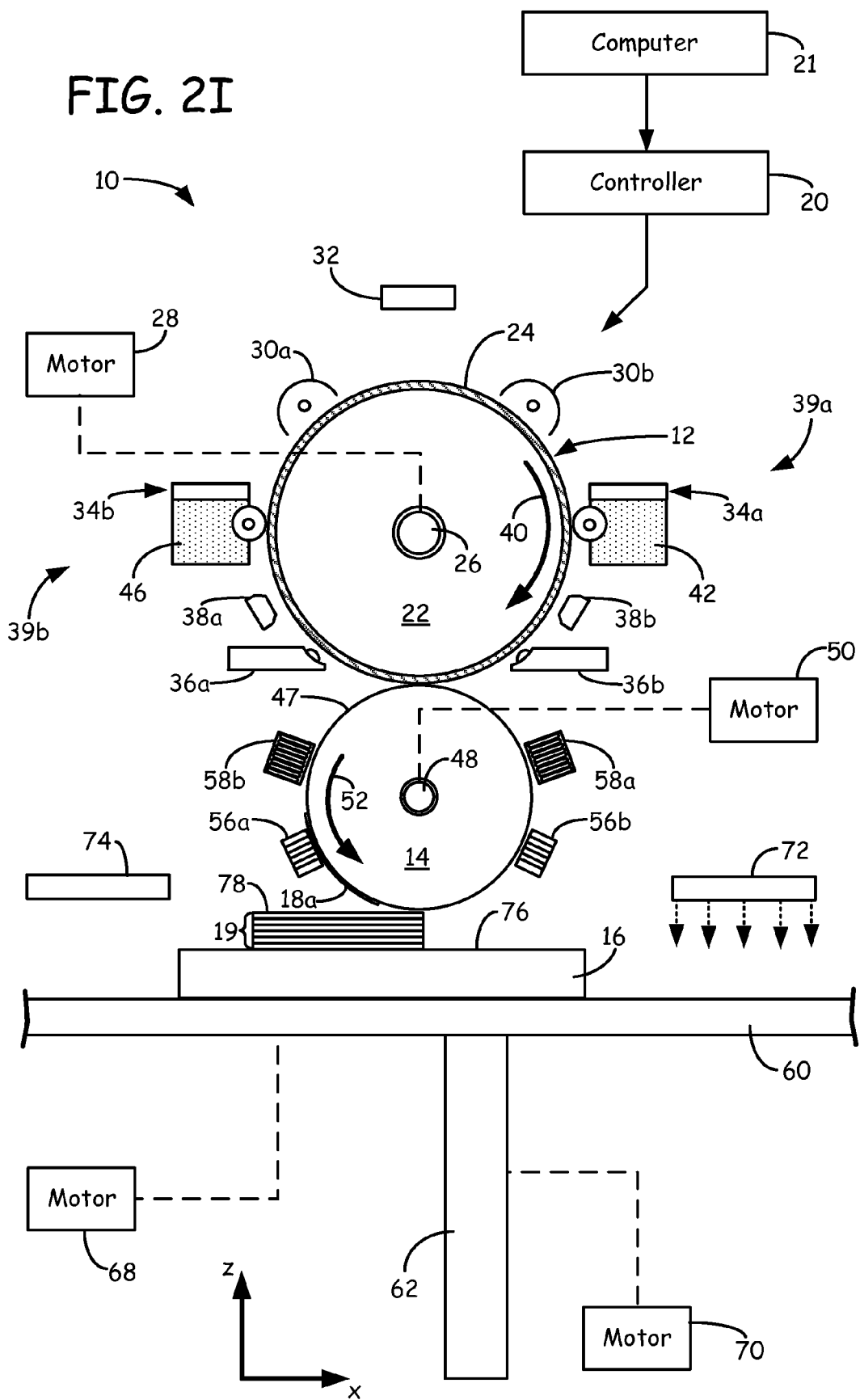
Figure 2J:
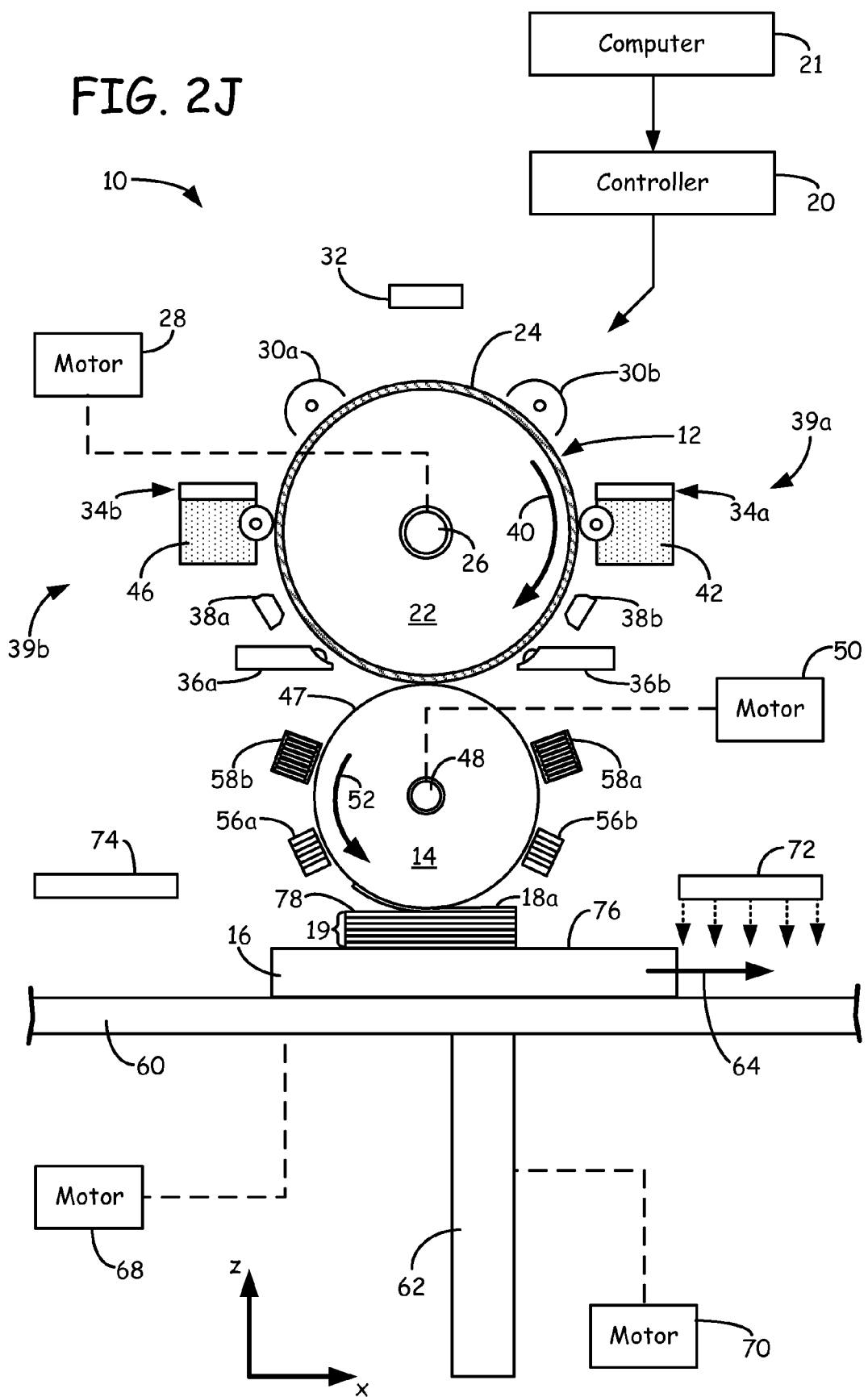

As shown in FIG. 2I, upon being transferred to surface 47, layer 18a is then heated to a tacky state with heating element 56a. As transfer drum 14 continues to rotate in the direction of arrow 52, layer 18a reaches a second transfer region at top surface 78 of support structure 19. As shown in FIG. 2J, controller 20 directs motor 68 to move platen 16 in the direction of arrow 64 via x-axis gantry 60, at a rate that is synchronized with the rotational rate of transfer drum 14 in the direction of arrow 52, as discussed above. This prevents frictional resistance from being generated therebetween, allowing layer 18a to be transferred from surface 47 and laminated onto top surface 78 of support structure 19 with accurate placement.

Figure 2K:
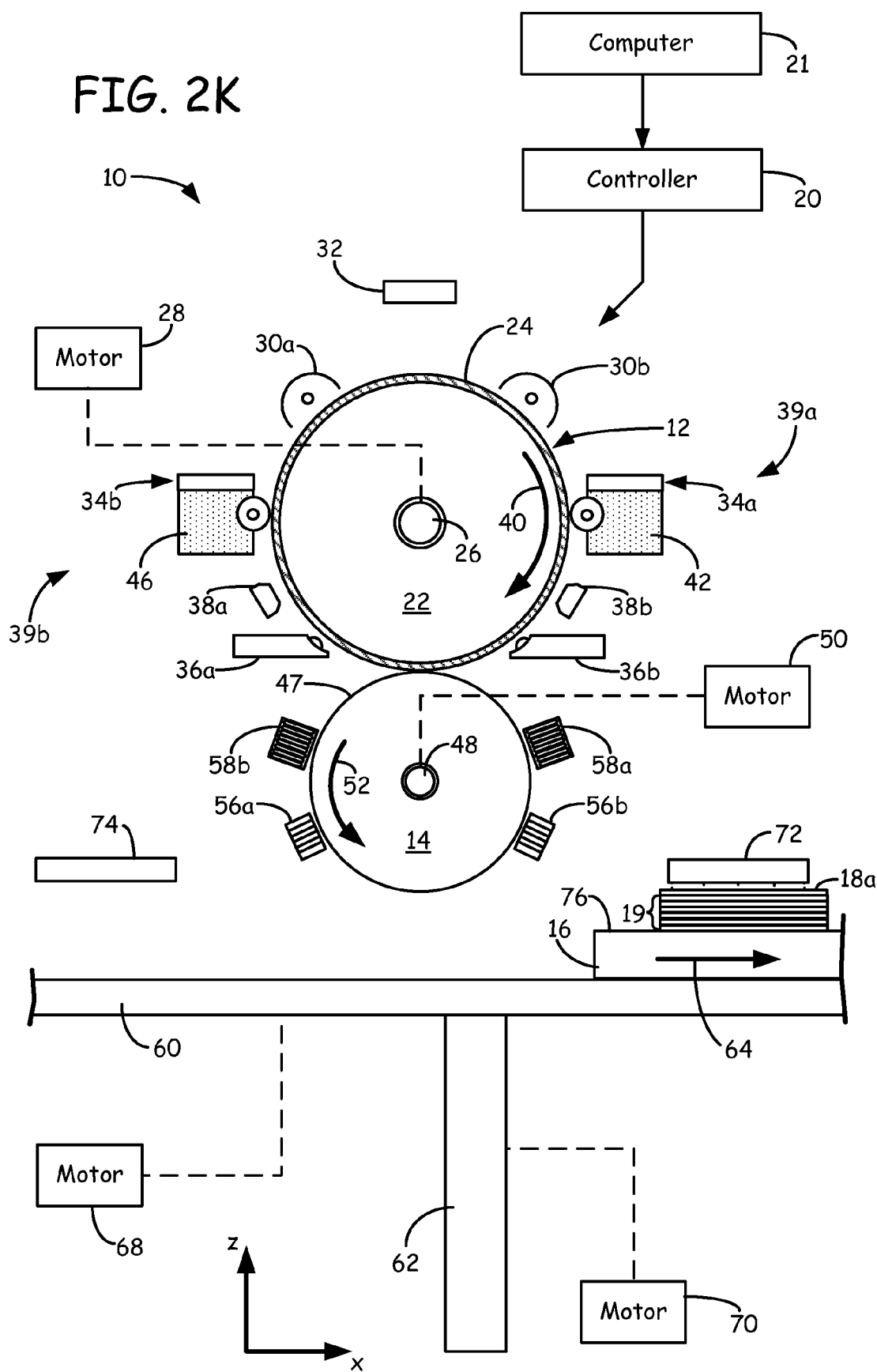

As shown in FIG. 2K, as platen 16 and the received layer 18a continue to move in the direction of arrow 64, layer 18a and support structure 19 are exposed to fixing element 72, which further heats layer 18a and support structure 19 to assist in securing layer 18a to top surface 78 of support structure 19. In some embodiments, fixing element 72 moves vertically to contact the top of layer 18a, applying pressure as well as heat to fuse together the printed material. Controller 20 may then direct z-axis motor 70 to appropriately move and reposition platen 16, layer 18a, and support structure 19 via z-axis gantry 60, and then direct motor 68 to move platen 16, layer 18a, and support structure 19 in the direction of arrow 66 via x-axis gantry 60 to reset the placement platen 16 and layer 18a for printing subsequent layers of 3D part 18 on top of layer 18a.

Figure 2L:
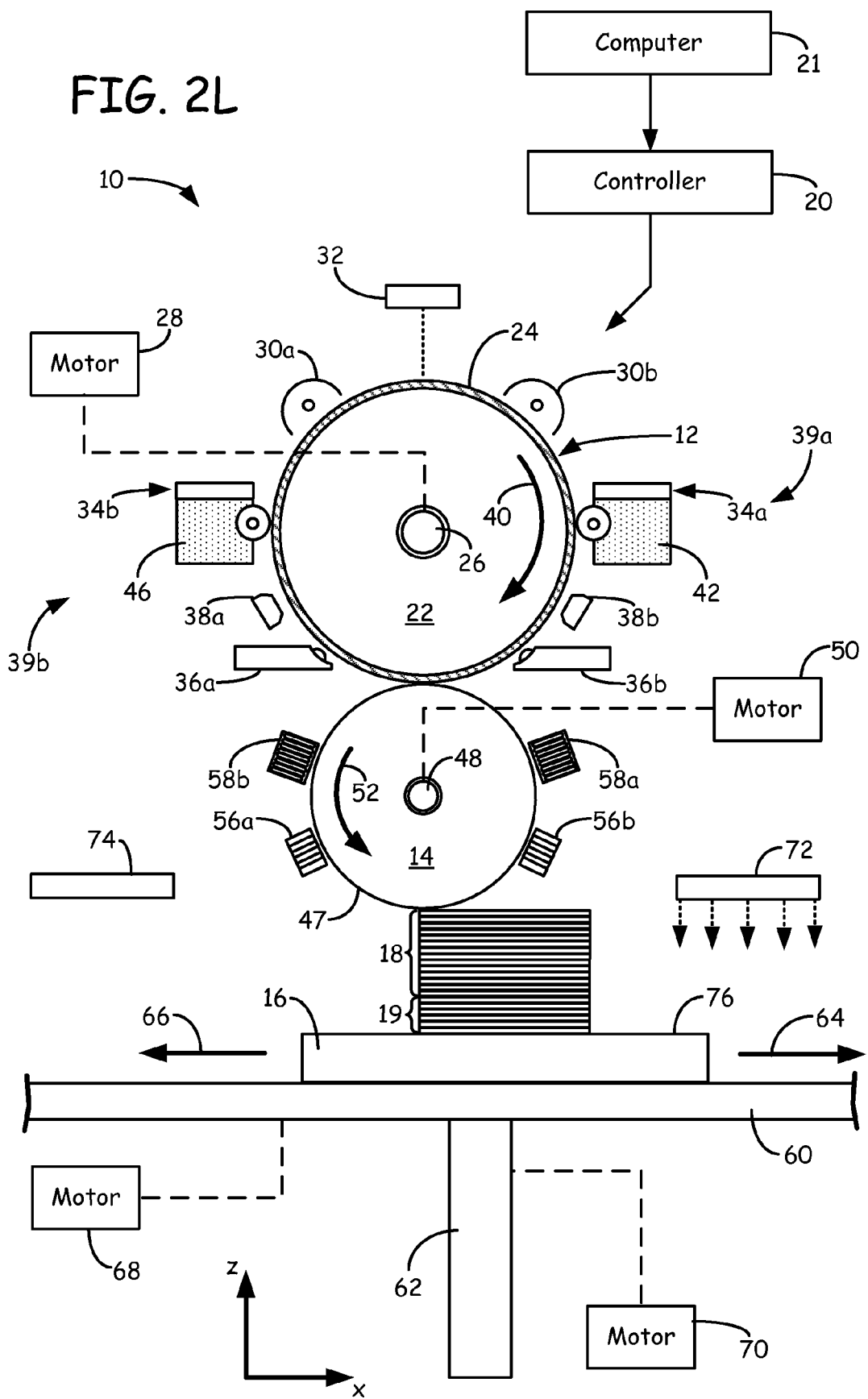

As shown in FIG. 2L, the above-discussed process may then be repeated to print each successive layer of 3D part 18 in a continuous manner by rotating photoconductor drum 12 and transfer drum 14 in the directions of arrows 40 and 52, respectively. For each printed layer, platen 16 is also desirably moved in the direction of arrow 64 to expose the printed layers of 3D part 18 and support structure 19 to fixing element 72, and then lowered a single increment along the z-axis.

In situations in which additional layers of support structure 19 and/or 3D part 18 are to be printed over the shown layers of 3D part 18, the above-discussed steps may be repeated in a reciprocating manner until 3D part 18 and support structure 19 are completed. When system 10 has completed printing of 3D part 18 and support structure 19, the printed stack of 3D part 18 and support structure 19 may be removed from system 10, and support structure 19 may be removed from 3D part 18. 3D part 18 may then undergo one or more post-printing operations.

In the examples illustrated in FIGS. 2A-2L, 3D part 18 and support structure 19 are printed in distinct blocks of layers, where system 10 prints the layers of support structure 19 (e.g., the steps shown in FIGS. 2A-2F) and then prints the layers of 3D part 18 (e.g., the steps shown in FIGS. 2G-2L). In these examples, photoconductor drum 12 continued to rotate in the same rotational direction over multiple revolutions for each material. However, in many situations, the layers of 3D part 18 and support structure 19 are printed in a co-planar manner, where a given layer of 3D part 18 is printed in the same increment as a given layer of support structure 19. In these operations, photoconductor drum 12 may be operated in the reciprocating or bi-directional manner after each development cycle. In other words, after rotating in the second rotational direction of arrow 44 to develop and transfer a single layer of support material 46, photoconductor drum 12 may reverse the rotation to the first rotational direction of arrow 40 to develop and transfer a single layer of part material 42. This reciprocating motion may then be repeated to form alternating layers of the support and part materials.

Figure 3A:
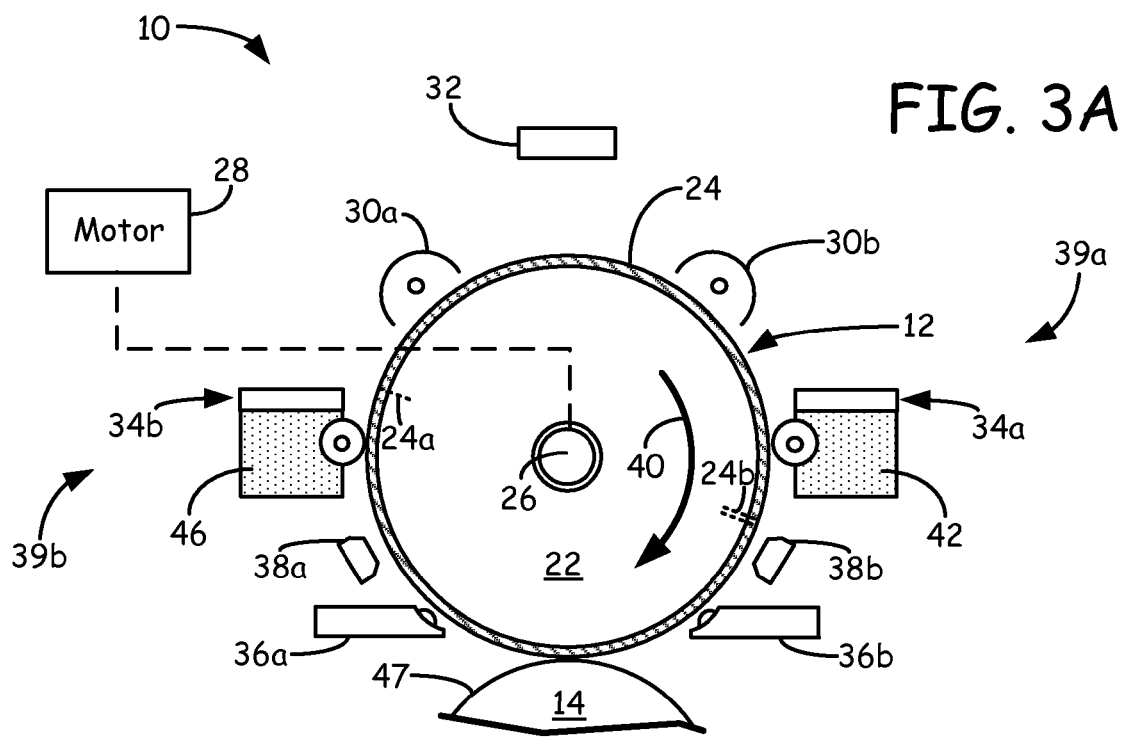
FIGS. 3A-3L are schematic illustrations of a portion of the additive manufacturing system of the present disclosure, illustrating an alternative printing operation to print a 3D part and support structure.

As shown in FIGS. 3A-3L, the reciprocating or bi-directional motion of system 10 is particularly suitable and efficient for printing multiple materials (e.g., part and support materials) in a co-planar or alternating manner, such as when the layers of 3D part 18 and support structure 19 are printed in the same increments, or as alternating adjacent layers. As shown in FIG. 3A, surface 24 of photoconductor drum 12 includes a first region 24a (illustrated by a single dashed line) and a second region 24b (illustrated by a pair of dashed lines), which are diametrically opposed across photoconductor drum 12.

Figure 3B:
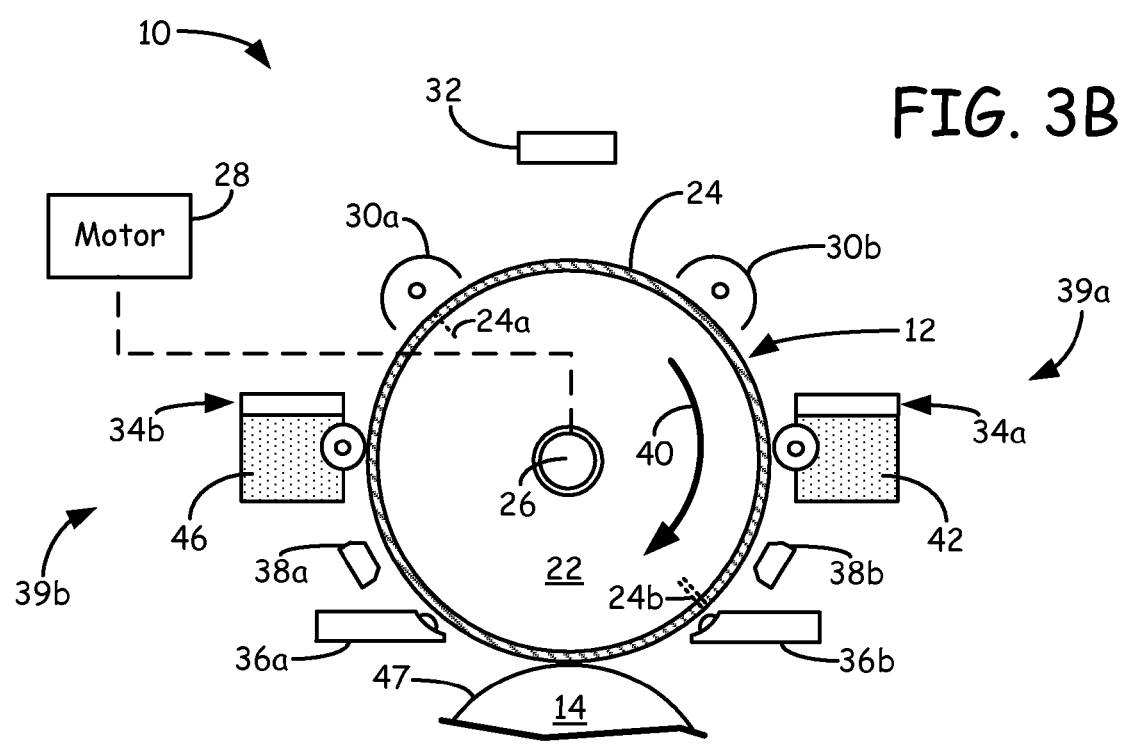

In the shown example, first region 24a is positioned between charge inducer 30a and development station 34b, and second region 24b is positioned between discharge device 38b and development station 34a. To form a layer of 3D part 18, controller 20 rotates photoconductor drum 12 in the first rotational direction of arrow 40 at the operating rotational rate. As shown in FIG. 3B, this positions first region 24a at charge inducer 30a to generate a uniform electrostatic charge on surface 24 at first region 24a.

Figure 3C:
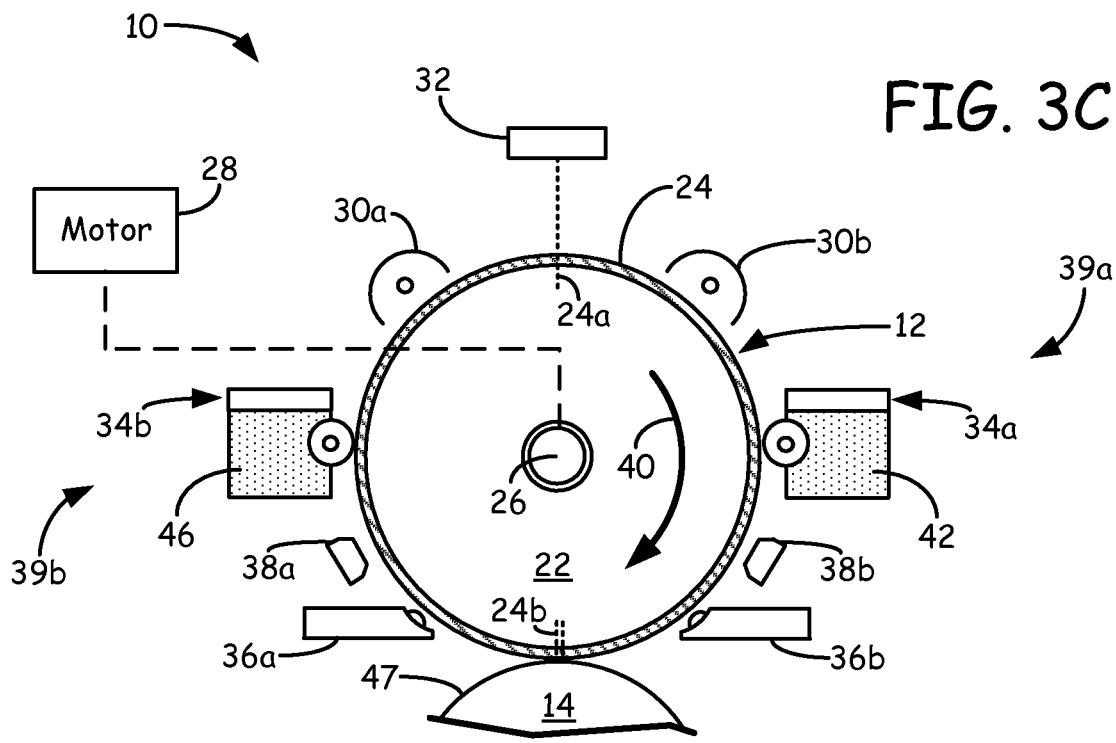

As shown in FIG. 3C, the continued rotation of photoconductor drum 12 in the direction of arrow 40 positions first region 24a at imager 32. Controller 20 directs imager 32 to selectively expose surface 24 at first region 24a to electromagnetic radiation to form a latent image charge pattern on first region 24a corresponding to the dimensions of the layer of support material 46 (or a corresponding negative image).

Figure 3D:
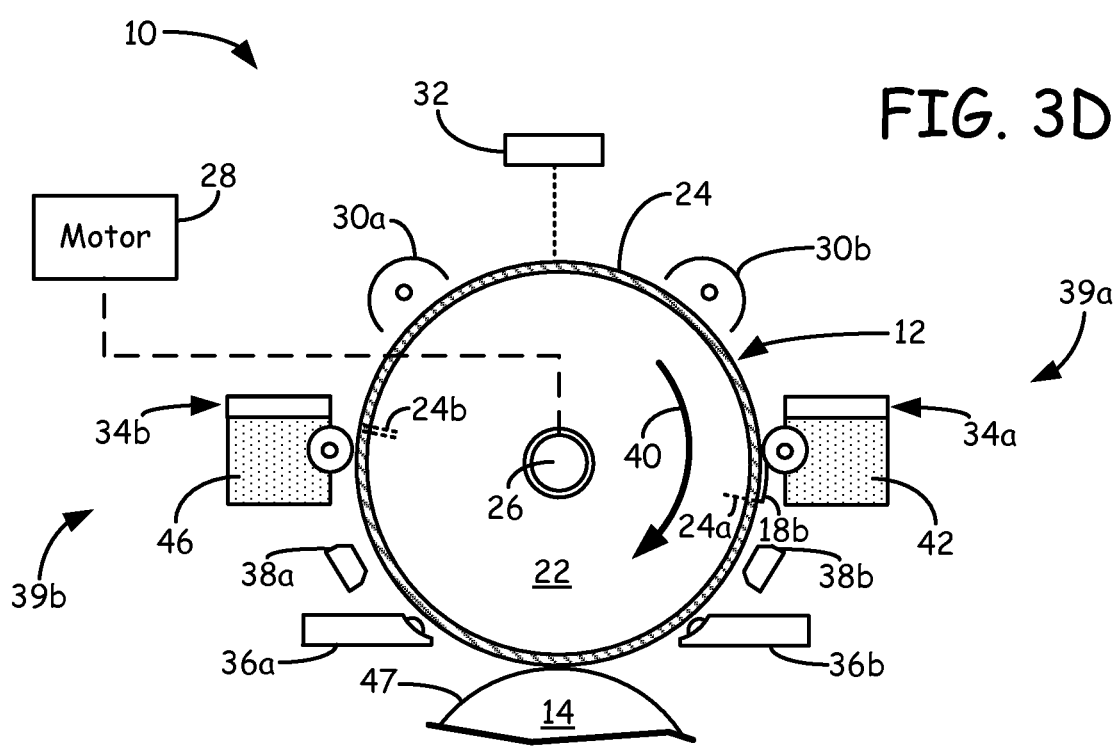

As shown in FIG. 3D, as photoconductor drum 12 continues to rotate in the direction of arrow 40 (bypassing the deactivated or disengaged charge inducer 30b), charged particles of part material 42 from development station 34a are attracted to the appropriately charged or discharged regions of the latent image on surface 24 at first region 24a. This forms layer 18b of part material 42 at first region 24a.

Figure 3E:
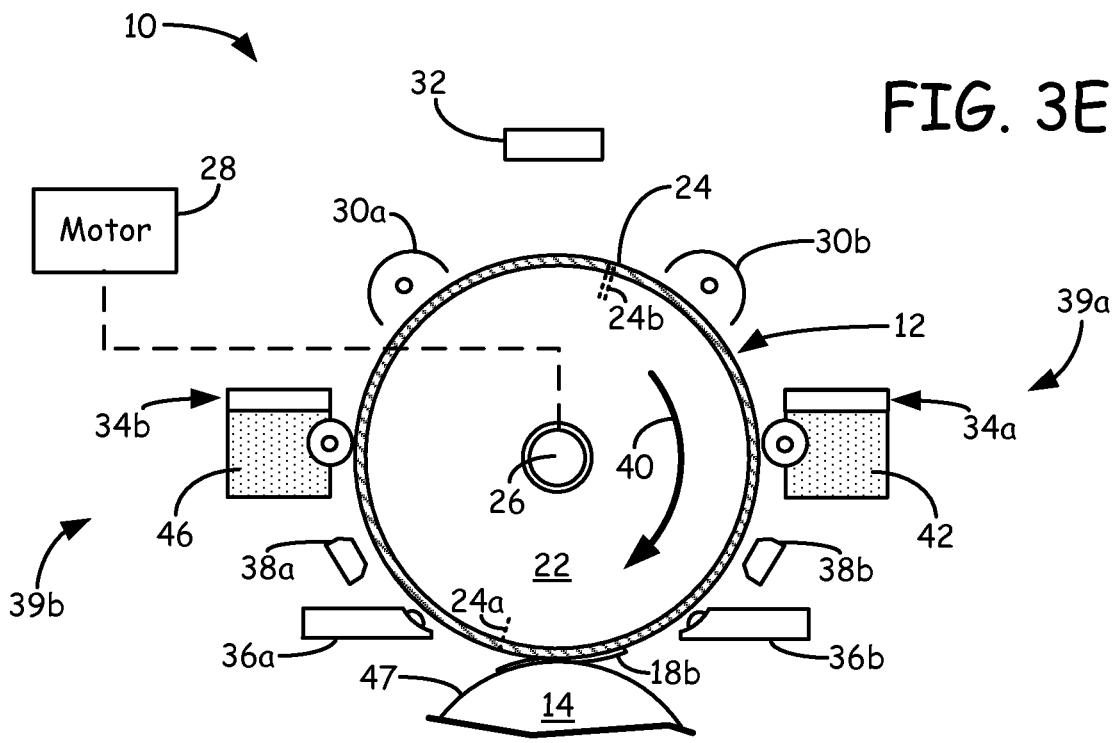

As shown in FIG. 3E, as photoconductor drum 12 continues to rotate in the direction of arrow 40 (bypassing the deactivated or disengaged discharge device 38b and cleaning station 36b), the charged particles of layer 18b are attracted to surface 47 of transfer drum 14, as discussed above.

Figure 3F:
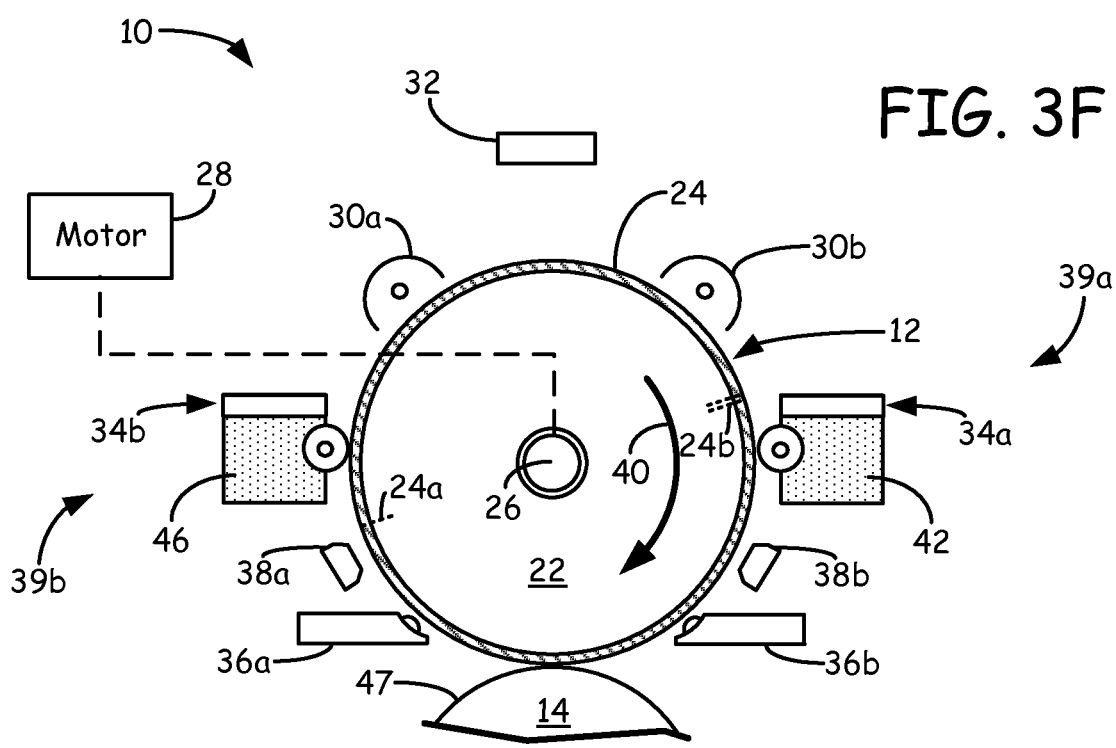

As shown in FIG. 3F, after layer 18b is transferred from photoconductor drum 12 to transfer drum 14, photoconductor drum 12 continues to rotate in the direction of arrow 40 such that first region 24a passes cleaning station 36a and discharge device 38a. This cleans and removes any residual electrostatic charge from surface 24 at first region 24a. As further shown, this also positions second region 24b of surface 24 between charge inducer 30b and development station 34a. In other words, the diametrically-opposed locations of first region 24a and second region 24b position second region 24b upstream from charge inducer 30b for developing a layer of support structure 19. Photoconductor drum 12 may also continue to rotate in the direction of arrow 40 up to about 180 degrees further to ensure that the entirety of surface 24 is cleaned.

Figure 3G:
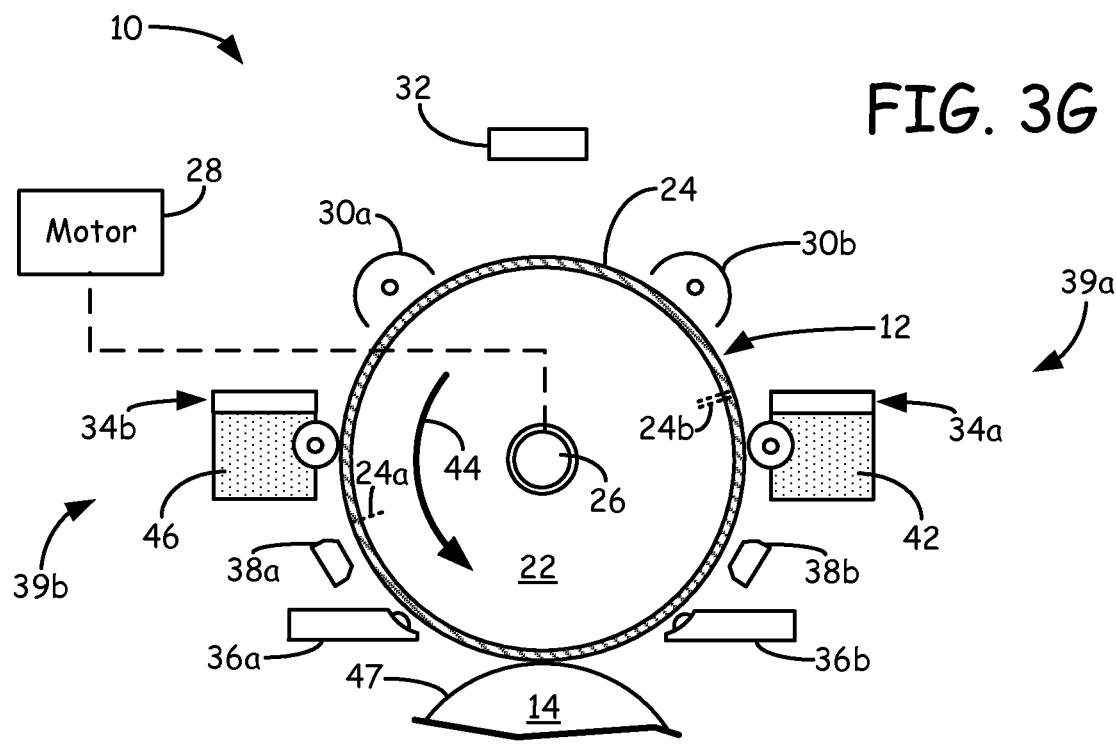
Figure 3H:
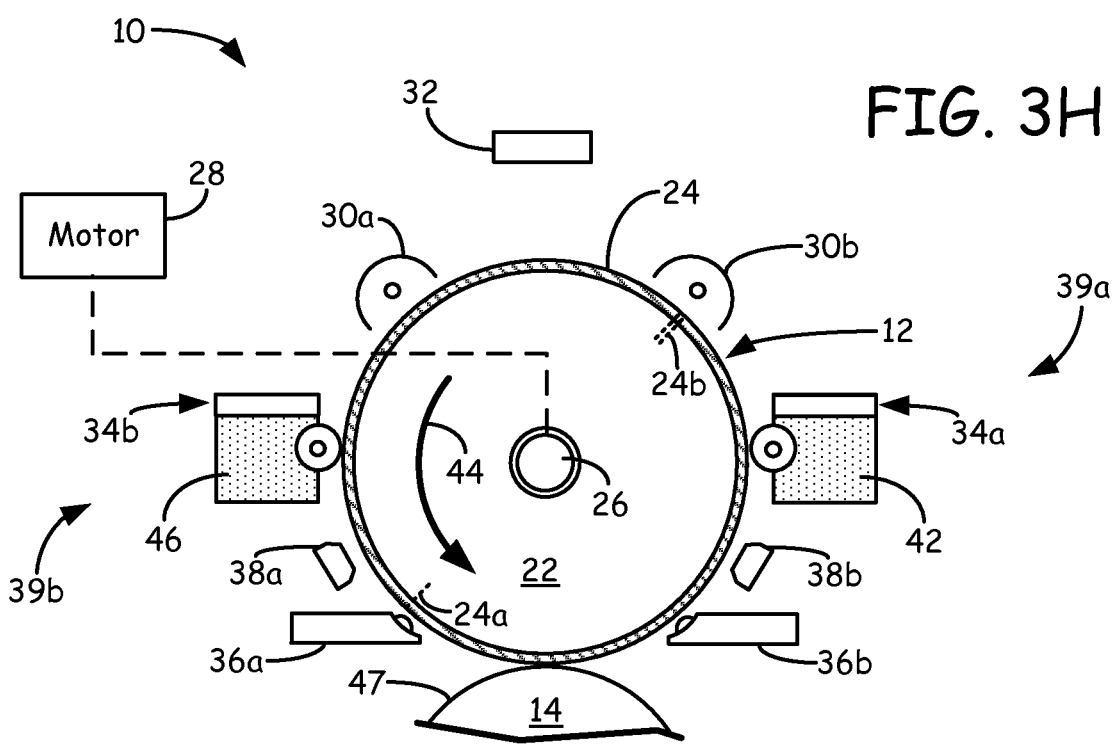

As shown in FIG. 3G, to develop a layer of support structure 19, controller 20 reverses the rotation of photoconductor drum 12 to rotate photoconductor drum 12 in the second rotational direction of arrow 44. When switching from part material 42 to support material 46, drive motor 28 slows photoconductor drum 12 down from the operating rotational rate in the first rotational direction to a zero rotation state. Drive motor 28 then rotates photoconductor drum 12 in the second rotational direction (i.e., opposite of the first rotational direction), from the zero rotational state to the operating rotational rate. As shown in FIG. 3H, this positions second region 24*b* at charge inducer 30*b* to generate a uniform electrostatic charge on surface 24 at second region 24*b*.

Figure 3I:
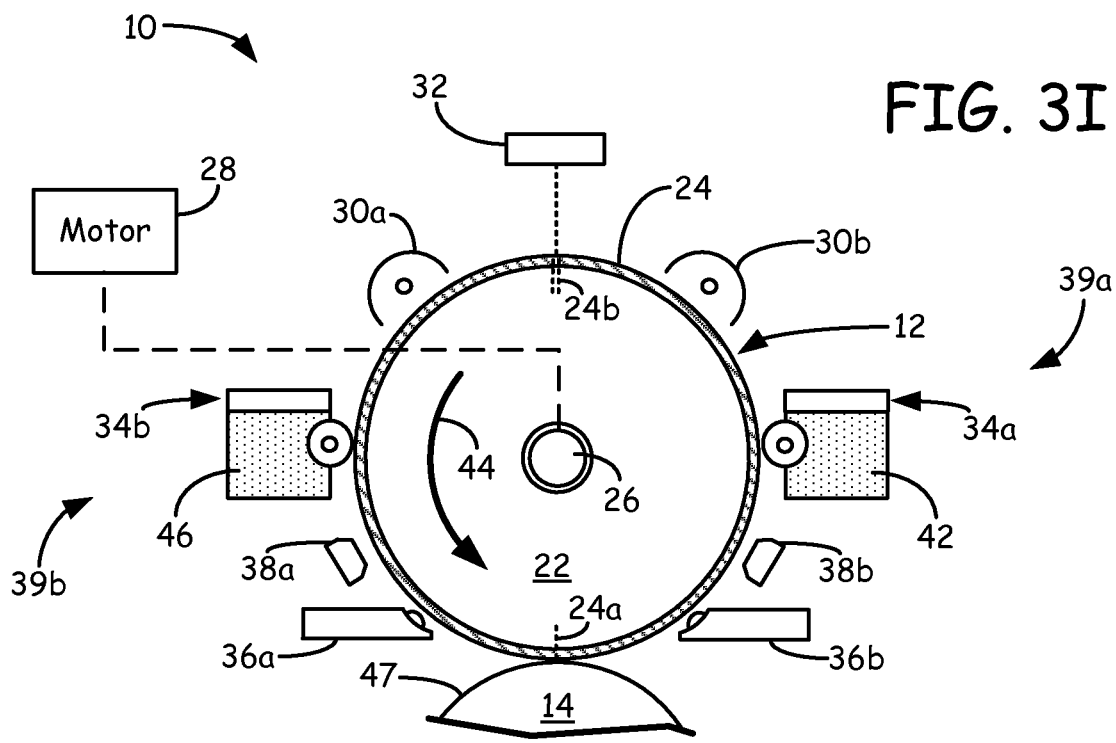

As shown in FIG. 3I, the continued rotation of photoconductor drum 12 in the direction of arrow 44 then positions second region 24*b* at imager 32. Controller 20 directs imager 32 to selectively expose surface 24 at second region 24*b* to electromagnetic radiation to form a latent image charge pattern on surface 24 at second region 24*b* corresponding to the dimensions of the layer of support material 46 (or a corresponding negative image).

Figure 3J:
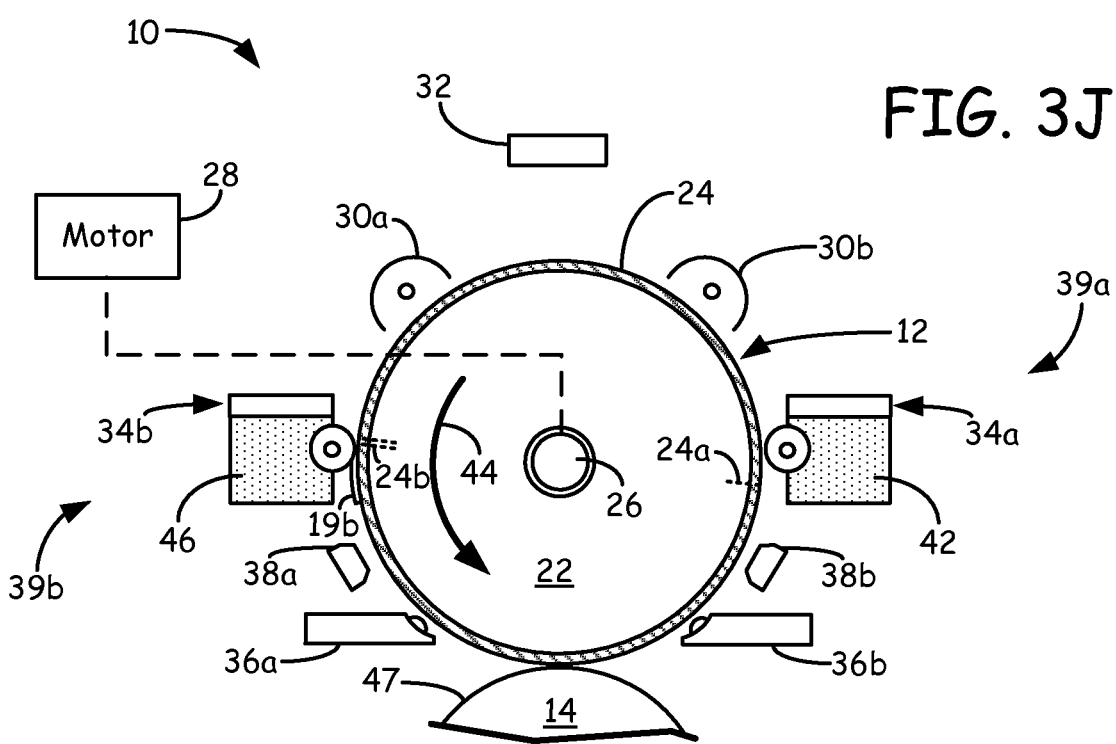

As shown in FIG. 3J, as photoconductor drum 12 continues to rotate in the direction of arrow 44 (bypassing the deactivated or disengaged charge inducer 30*a*), charged particles of support material 46 from development station 34*b* are attracted to the appropriately charged or discharged regions of the latent image on surface 24 at second region 24*b*. This forms layer 19*b* of support material 46 on surface 24 at second region 24*b*.

Figure 3K:
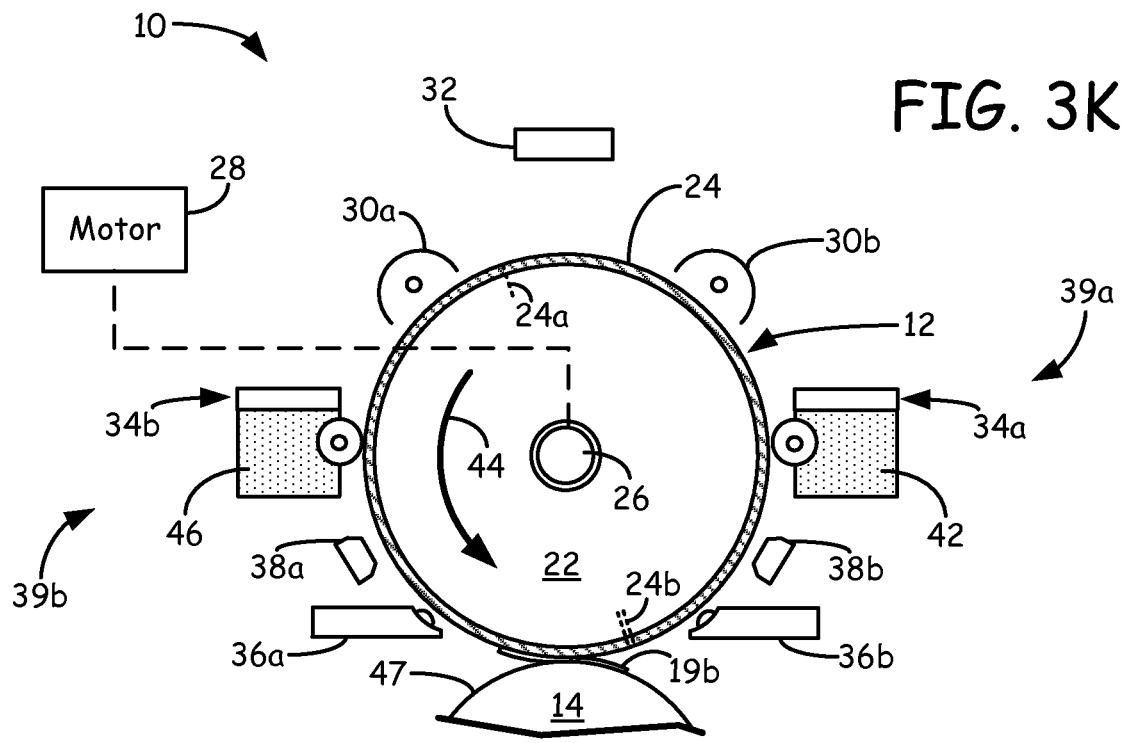

As shown in FIG. 3K, as photoconductor drum 12 continues to rotate in the direction of arrow 44 (bypassing the deactivated or disengaged discharge device 38*a* and cleaning station 36*a*), the charged particles of layer 19*b* are attracted to surface 47 of transfer drum 14, as discussed above.

Figure 3L:
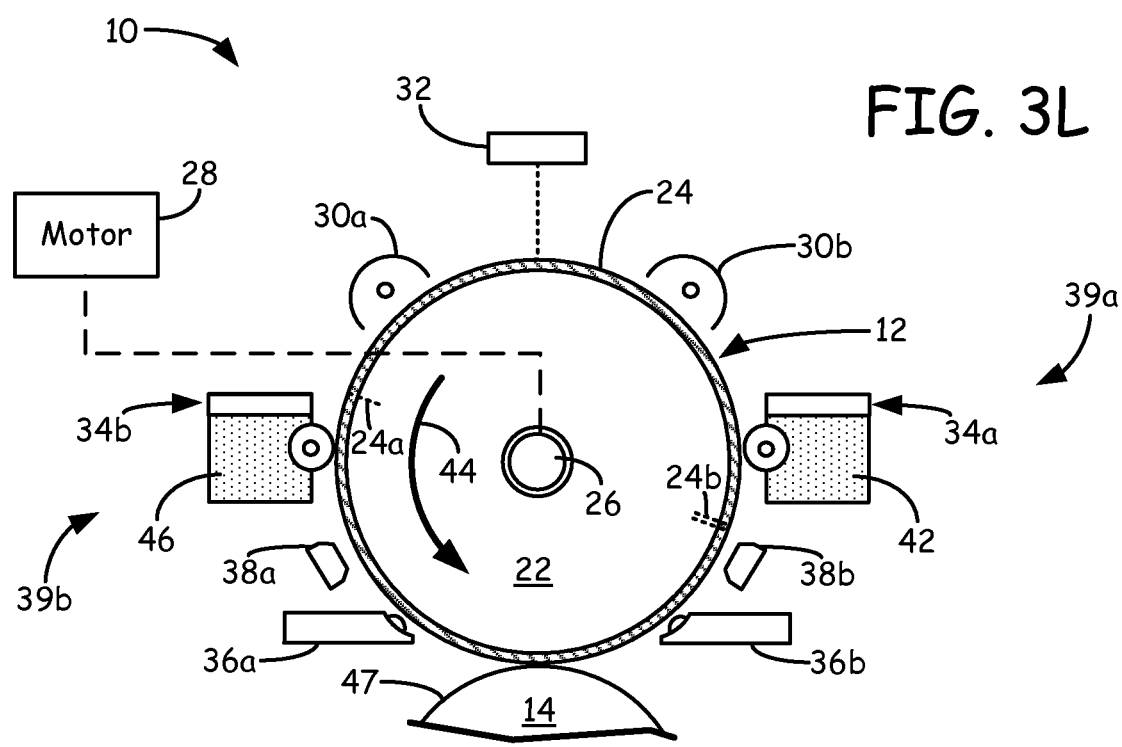

As shown in FIG. 3L, after layer 19*b* is transferred from photoconductor drum 12 to transfer drum 14, photoconductor drum 12 continues to rotate in the direction of arrow 44 such that second region 24*b* passes cleaning station 36*b* and discharge device 38*b*. This cleans and removes any residual electrostatic charge from surface 24 at second region 24*b*. As further shown, this also repositions first region 24*a* of surface 24 between charge inducer 30*a* and development station 34*b* (i.e., upstream from charge inducer 30*a* for developing the next layer of 3D part 18, as discussed above). Photoconductor drum 12 may also continue to rotate in the direction of arrow 44 up to about 180 degrees further to ensure that the entirety of surface 24 is cleaned.

The processes discussed above in FIGS. 2A-2L and FIGS. 3A-3L may be used interchangeably to form the various layers of 3D part 18 and support structure 19. For example, the steps shown in FIGS. 2A-2F may be repeated (with photoconductor drum 12 being continuously rotated in the second rotational direction of arrow 44 over multiple revolutions) to form multiple layers of support structure 19, the steps shown in FIGS. 2G-2L may be repeated (with photoconductor drum 12 being continuously rotated in the first rotational direction of arrow 40 over multiple revolutions) to form multiple layers of 3D part 18, the steps shown in FIGS. 3A-3L may be repeated (in either order) to form single layer increments with part and support materials and/or alternating layers of part and support materials, and combinations and variations thereof.

In some embodiments, a layer portion of support material 46 and a layer portion of part material 42 may both be developed and transferred to transfer drum 14 prior to being laminated on platen 16. For example, system 10 may develop a layer portion of support material 46 and transfer the layer portion to transfer drum 14. Prior to transferring the layer portion of support material 46 from transfer drum 14 to platen 16, system 10 may develop a layer portion of part material 42 and transfer the layer portion to transfer drum 14 to coincide with the previously formed layer portion of support material 46. System 10 may then transfer the resulting layer from transfer drum 14 to platen 16 in a single lamination step and then further heat the resulting laminated layer with either fixing element 72 or fixing element 74.

While illustrated in FIGS. 2A-2L and FIGS. 3A-3L as operating in separate and distinct steps, the separate components of system 10 desirably operate in a continuous manner to reduce overall printing times. For example, as discussed above, system 10 may perform multiple development cycles during each revolution of photoconductor drum 12 and transfer drum 14. Accordingly, system 10 is suitable for printing 3D parts and support structures from part and support materials at high rates and with good part resolutions. In some embodiments, system 10 may print layers of 3D part 18 and support structure 19 at a rate of at least about 40 layers per minutes (e.g., about 50 layers per minute) with accurate registrations, layer thicknesses ranging from about 5 micrometers to about 125 micrometers, and layer dimensions along the y-axis of at least 51 centimeters (about 11 inches).

The resolutions of the 3D parts and support structures may also be varied based on the printing rate. For example, 3D part 18 may be printed at a "high quality" resolution, in which system 10 operates at a slower rate, but prints with lower layer thicknesses. Alternatively, 3D part 18 may be printed at a "draft quality" resolution, in which system 10 operates a faster rate, but prints with greater layer thicknesses. Furthermore, 3D part 18 may be printed in "gray scale", in which a lower density of part material 42 is developed onto surface 24. Numerous resolutions and speeds therebetween may also be incorporated.

Figure 5:
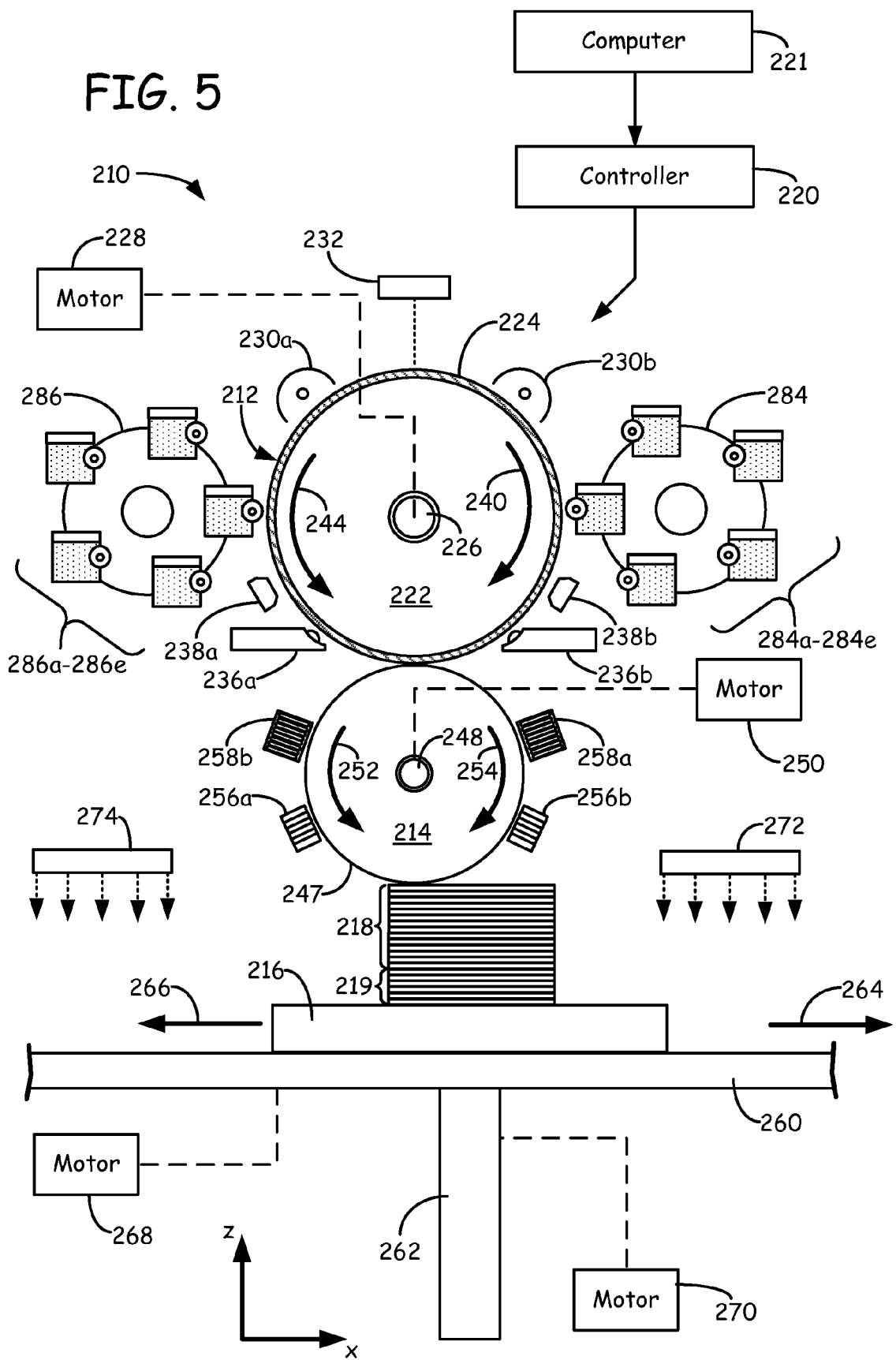
FIG. 5 is a schematic illustration of a second alternative and preferred additive manufacturing system of the present disclosure, which includes carousels of development stations.

Furthermore, while illustrated with part material 42 and support material 46, system 10 may alternatively operate with a variety of different materials, such as two part materials with different compositions and/or different colors. Moreover, as shown in FIGS. 4 and 5, the additive manufacturing systems of the present disclosure may include additional development stations to build 3D parts and/or support structures with a variety of different compositions and colors.

For example, FIG. 4 illustrates system 110, which is similar to system 10 (shown in FIGS. 1, 2A-2L, and 3A-3L) for printing 3D part 118 and support structure 119 in a layer-by-layer manner using electrophotography, where reference numbers are increased by "100" from those of system 10. As shown in FIG. 4, system 110 includes development stations 134*a* and 134*b*, which correspond to development stations 34*a* and 34*b* of system 10. However, system 110 also includes development stations 134*c* and 134*d*, where development station 134*c* is located adjacent to development station 134*a*, and development station 134*d* is located adjacent to development station 134*b*. Suitable devices for development stations 134*c* and 134*d* includes those discussed above for development stations 34*a* and 34*b*.

In this embodiment, development stations 134*c* and 134*d* allow system 110 to print 3D part 118 and/or support structure 119 with additional materials (e.g., additional colors). For example, development stations 134*c* and 134*d* may include colorants 180 and 182, which may diffuse into the developed layers of part material 142 and/or support material 146. As such, the layers of 3D part 118 and/or support structure 119 may be printed with different colors based on colorants 180 and 182. Alternatively, development stations 134*a*, 134*c*, and 134*d* may each include part materials 142, 180, and 182 having different compositions or colors, where system 110 may selectively form layers of 3D part 118 with one or more of part materials 142, 180, and 182.

During operation, while rotating photoconductor drum 122 in the first rotational direction of arrow 140, controller 120 may transfer part material 142 or colorant 180 by selectively engaging either development station 134*a* or development station 134*c* with surface 124, thereby attracting the respective materials from the engaged development station. Alternatively, while rotating photoconductor drum 122 in the second rotational direction of arrow 144, controller 120 may apply either support material 146 or part material 182 by selectively engaging either development station 134b or development station 134d with surface 124, thereby attracting the respective material from the engaged development station. Accordingly, system 110 increases the number of materials that may be used to form 3D parts and support structures.

FIG. 5 illustrates system 210, which is similar to system 10 (shown in FIGS. 1, 2A-2L, and 3A-3L) and system 110 (shown in FIG. 4) for printing 3D part 218 and support structure 219 in a layer-by-layer manner using electrophotography, where reference numbers are increased by "200" from those of system 10. As shown in FIG. 5, system 210 is a preferred embodiment of the present disclosure that includes carousels 284 and 286, which are independently rotatable carousels that include development stations 284a-284e and 286a-286e, receptively.

Development stations 284a-284e and 286a-286e may each function in a similar manner to development stations 34a and 34b of system 10, and to development stations 134a-134d of system 110. However, in this embodiment, development stations 284a-284e and 286a-286e allow system 210 to print 3D part 218 and/or support structure 219 with even more materials (e.g., additional colors).

For example, development station 284a may include a part material, development station 286a may include a support material, and development stations 284b-284e and 286a-286e may include different colorants that may diffuse into the developed layers of the part material and/or support material. In this embodiment, the colorants retained in development stations 284b-284e and 286a-286e may apply colors to the part and/or support materials using one or more color creation techniques, such as selective spot colors, subtractive color creation using cyan, yellow, magenta, and black materials, and/or additive color creation (e.g., partitive color creation) using cyan, yellow, magenta, red, green, blue, and black materials.

During operation, controller 220 may rotate carousels 284 and 286 independently of each other in a unidirectional or bi-directional manner, and independent from the rotations of photoconductor drum 212 and transfer drum 214, to align the desired development stations of development stations 284a-284e and 286a-286e with photoconductor drum 212. As such, system 212 may operate in the same manner as discussed above for system 10 to print 3D parts and support structures (e.g., 3D part 218 and support structure 219), where the materials from development stations 284a-284e and 286a-286e may be selectively developed and transferred to platen 216 to provide a variety of different functional and/or aesthetic qualities to the printed 3D parts and support structures.

The reciprocating or bi-directional rotations of photoconductor drum 222 and transfer drum 214 (and the reciprocating motions of platen 216) further allow controller 220 to selectively develop and transfer materials from either carousel 284 or carousel 286 based on the rotational directions of photoconductor drum 212 and transfer drum 214. While illustrated with two carousels of development stations (i.e., carousels 284 and 286), system 210 may alternatively include three or more carousels of development stations. Furthermore, while illustrated with five development stations per carousel, the carousels of system 210 may alternatively include different numbers of development stations based on particular material requirements for printing 3D parts and support structures. Moreover, while depicted with carousels (i.e., carousels 284 and 286), system 210 may alternatively incorporate different mechanisms for selectively and interchangeably engaging the multiple development stations with photoconductor drum 222.

Figure 6:
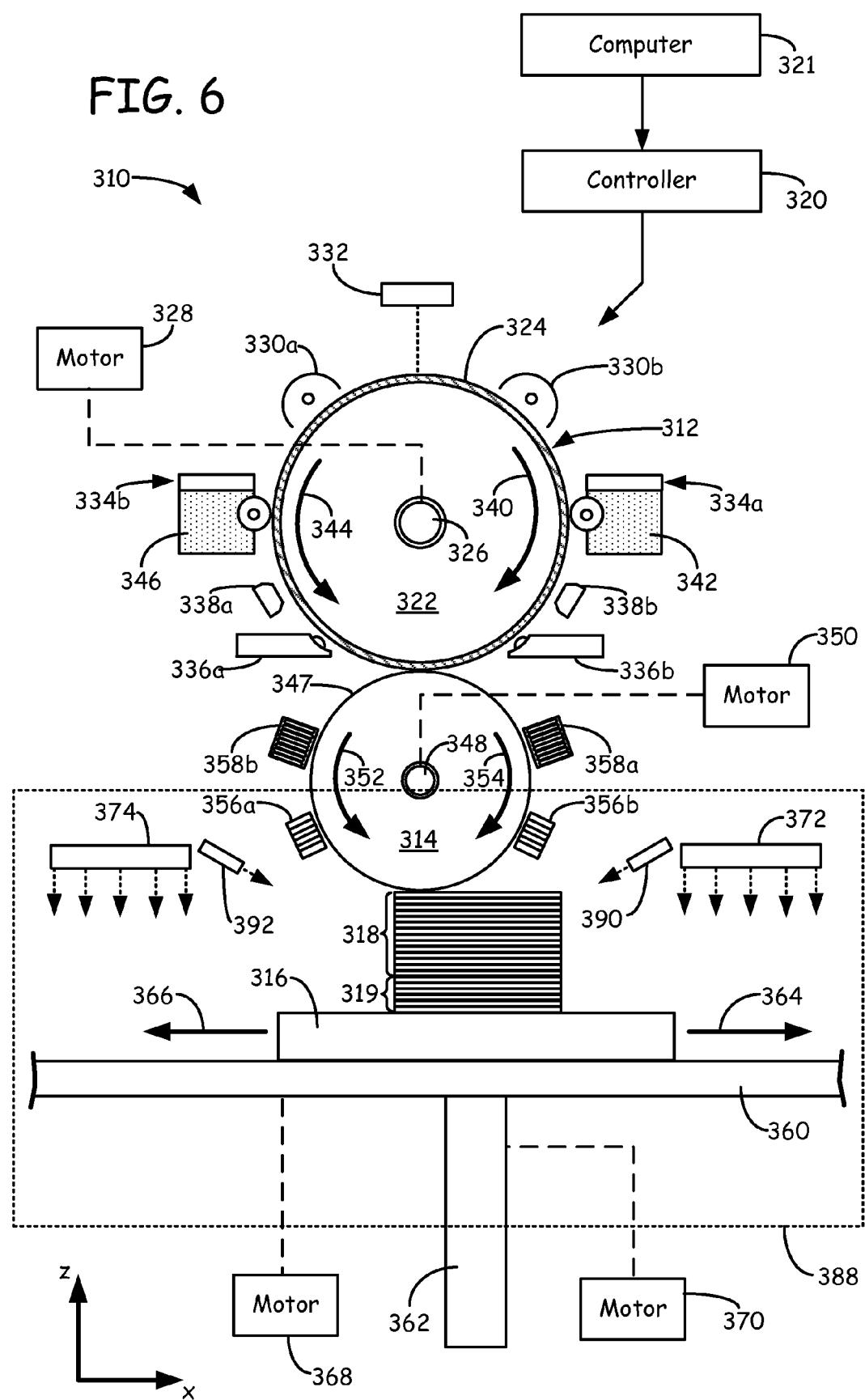
FIG. 6 is a schematic illustration of a third alternative additive manufacturing system of the present disclosure, which includes a heated chamber.

FIG. 6 illustrates system 310, which is similar to system 10 for printing 3D part 318 and support structure 319 in a layer-by-layer manner using electrophotography, where reference numbers are increased by "300" from those of system 10. While illustrated with a pair of development stations 334a and 334b, system 310 may alternatively include additional development stations, such as those of system 110 (shown in FIG. 4) and/or system 210 (shown in FIG. 5).

As shown in FIG. 6, system 310 may operate in the same manner as system 10, and also includes heated chamber 388. Heated chamber 388 extends around platen 316, and defines an enclosable environment for printing 3D part 318 and support structure 319. In the shown example, heated chamber 388 partially encloses z-axis gantry 362 and the bottom portion of transfer drum 314, allowing z-axis gantry 362 and transfer drum 314 to extend through the walls of heated chamber 388. For example, the ceiling portion of heated chamber 388 may include a slot opening (not shown) configured to receive the bottom portion of transfer drum 314 while transfer drum 314 rotates, while also desirably minimizing the dissipation of heat from heated chamber 388.

Heated chamber 388 is configured to be heated to, and maintained at, one or more temperatures that are in a window between the solidification temperature and the creep relaxation temperature of part material 342 and/or support material 346. This reduces the risk of mechanically distorting (e.g., curling) 3D part 318 and support structure 319, where the creep relaxation temperature of part material 342 is proportional to the glass transition temperature of part material 342. Examples of suitable techniques for determining the creep relaxation temperatures of the part and support materials are disclosed in Batchelder et al., U.S. Pat. No. 5,866,058.

The use of heated chamber 388 may require the use of cooling units 390 and 392. Cooling units 390 and 392 are gas jet (e.g., air jet) units configured to blow localized air to the top layers of the stack of 3D part 318 and support structure 319 when platen 316 moves in the directions of arrows 364 and 366. In an alternative embodiment, cooling units 390 and 392 may be integrated in fixing elements 372 and 374. The use of fixing units 372 and 374, and cooling units 390 and 392 further increase the capability of system 310 to provide variable temperature and pressure control to transfer the layers from transfer drum 314 to platen 316.

Because system 310 is capable of printing layers of part material 342 and support material 346 at high speeds, the tackified materials for the printed layers do not have sufficient time to cool below their creep relaxation temperatures before successive layers are printed. As such, heat from the tackified materials can build up in the printed layers, preventing them from cooling down to sufficient temperatures to vertically support the successive layers. Cooling units 390 and 392 direct gas (e.g., air) to the top printed layer of the stack to cool the top layer down (e.g., to about the creep relaxation temperature of the part or support material). This allows the cooled layer to have sufficient strength to vertically support successively printed layers, while also reducing the risk of curling effects.

As mentioned above, proper transfer of the developed layers of part and support materials from transfer drum 314 to the top layer of the stack of 3D part 318 and support structure 319 is dependent on multiple factors, such as the pressure between transfer drum 314 and the top layer of the stack, the temperature of the layer being transferred (e.g., how tacky the material is), the contact duration between the transferred layer and the top layer of the stack, the adhesive properties of the part and support materials, and the like.

In one embodiment, system 310 operates with one or more feedback process control loops to monitor and adjust the height of platen 316 based on measured pressures between transfer drum 314 and platen 316. In an additional embodiment, system 310 also operates with one or more feedback process control loops to monitor and adjust the temperatures of heaters 356a and 356b, of heated chamber 388, and of cooling units 390 and 392 based on measured temperatures of the layers of part and support materials. Examples of suitable techniques for such feedback process control loops are disclosed in co-filed U.S. Provisional Patent Application No. 61/538,491 entitled "Layer Transfusion For Electrophotography-Based Additive Manufacturing".

The terms "about" and "substantially" are used herein with respect to measurable values and ranges due to expected variations known to those skilled in the art (e.g., limitations and variabilities in measurements). All temperatures referred to herein are based on atmospheric pressure (i.e. one atmosphere).

Although the present disclosure has been described with reference to preferred embodiments, workers skilled in the art will recognize that changes may be made in form and detail without departing from the spirit and scope of the disclosure.

The invention claimed is:

1. An additive manufacturing system for printing a three-dimensional part, the additive manufacturing system comprising:
   a photoconductor component having a surface;
   a first development station configured to develop layers of a first material on the surface of the photoconductor component;
   a second development station configured to develop layers of a second material on the surface of the rotatable photoconductor;
   a transfer component having a surface configured to receive the developed layers from the surface of the photoconductor component;
   a controller configured to rotate the photoconductor component in opposing first and second rotational directions, and to rotate the transfer component in first and second counter rotational directions that are respectively synchronized with and counter to the first and second rotational directions of the photoconductor component;
   a first heater configured to heat the received developed layers on the transfer component while the transfer component rotates in the first counter rotational direction;
   a second heater configured to heat the received developed layers on the transfer component while the transfer component rotates in the second counter rotational direction; and
   a moveable platen configured to receive the heated layers from the transfer component to print the three-dimensional part from at least a portion of the received heated layers.

2. The additive manufacturing system of claim 1, and further comprising:
   a first charge inducer configured to generate first uniform electrostatic charges to the surface of the photoconductor component while the photoconductor component rotates in the first rotational direction;
   a second charge inducer configured to generate second uniform electrostatic charges to the surface of the photoconductor component while the photoconductor component rotates in the second rotational direction; and
   an imager configured to generate first latent images from the first uniform electrostatic charges, and to generate second latent images from the second uniform electrostatic charges, wherein the developed layers of the first material are based on the first latent images, and the developed layers of the second material are based on the second latent images.

3. The additive manufacturing system of claim 1, and further comprising at least one fixing element configured to further heat at least a portion of the received heated layers on the platen.

4. The additive manufacturing system of claim 1, wherein the photoconductor component comprises a first electrically-conductive rotatable drum, and wherein the surface of the photoconductor component comprises a photoconductive surface.

5. The additive manufacturing system of claim 4, wherein the transfer component comprises a second rotatable drum.

6. The additive manufacturing system of claim 1, and further comprising:
   a third development station configured to develop a layer of a third material on the surface of the photoconductor component while the photoconductor component rotates in the first rotational direction; and
   a fourth development station configured to develop a layer of a fourth material on the surface of the photoconductor component while the photoconductor component rotates in the second rotational direction;
   wherein the controller is further configured to interchangeably operate the first development station and the third development station while the photoconductor component rotates in the first rotational direction, and to interchangeably operate the second development station and the fourth development station while the photoconductor component rotates in the second rotational direction.

7. The additive manufacturing system of claim 1, and further comprising:
   a first cooling unit configured to cool the surface of the transfer component while the transfer component rotates in the first counter rotational direction; and
   a second cooling unit configured to cool the surface of the transfer component while the transfer component rotates in the second counter rotational direction.

8. The additive manufacturing system of claim 1, and further comprising at least one cooling unit configured to blow localized cooling air to at least a portion of the received heated layers on the platen.

9. An additive manufacturing system for printing a three-dimensional part, the additive manufacturing system comprising:
   a photoconductor component having a surface;
   first and second development stations located along opposing sides of the photoconductor component, and configured to develop layers on the surface of the photoconductor component;
   a transfer component configured to receive the developed layers from the surface of the photoconductor component;
   a controller configured to rotate the photoconductor component in opposing first and second rotational directions, and to rotate the transfer component in first and second counter rotational directions that are respectively synchronized with and counter to the first and second rotational directions of the photoconductor component;
   a first heater located along a first side of the transfer component, the first heater being configured to heat a first portion of the developed layers on the transfer component while the transfer component rotates in the first counter rotational direction;

a second heater along a second side of the transfer component that is opposite of the first side of the transfer component, the second heater being configured to heat a second portion of the developed layers on the transfer component while the transfer component rotates in the second counter rotational direction; and a platen configured to receive the heated layers from the transfer component to print the three-dimensional part from at least a portion of the received heated layers.

10. The additive manufacturing system of claim 9, and further comprising:

a first cooling unit located along the second side of the transfer component, the first cooling unit being configured to cool a surface of the transfer component while the transfer component rotates in the first counter rotational direction; and a second cooling unit located along the first side of the transfer component, the second cooling unit being configured to cool the surface of the transfer component while the transfer component rotates in the second counter rotational direction.

11. The additive manufacturing system of claim 9, and further comprising a rotatable carousel that carries the first development station and at least one additional development station.

12. The additive manufacturing system of claim 9, and further comprising at least one fixing element configured to further heat at least a portion of the received heated layers on the platen.

13. The additive manufacturing system of claim 9, and further comprising:

a first charge inducer configured to generate uniform electrostatic charges to the surface of the photoconductor component while the photoconductor component rotates in the first rotational direction; and a second charge inducer configured to generate second uniform electrostatic charges to the surface of the photoconductor component while the photoconductor component rotates in the second rotational direction; and an imager configured to generate latent images from the first and second uniform electrostatic charges, wherein the developed layers are based on the latent images.

14. The additive manufacturing system of claim 9, and further comprising a chamber at least partially enclosing the platen, wherein the chamber is configured to be heated to one or more temperatures.

15. A method for printing a three-dimensional part and a support structure, the method comprising:

developing a layer of the support structure from a first development station onto a surface of a photoconductor component while the photoconductor component is rotating in a first rotational direction;

transferring the developed layer of the support structure from the surface of the photoconductor component to a transfer component while the transfer component is rotating in a first counter rotational direction that is synchronized with and counter to the first rotational direction of the photoconductor component;

heating the developed layer of the support structure on the transfer component while the transfer component is rotating in the first counter rotational direction;

transferring the heated layer of the support structure from the rotatable transfer component to a platen;

developing a layer of the three-dimensional part from a second development station onto the surface of the photoconductor component while the photoconductor component is rotating in a second rotational direction that is opposite of the first rotational direction;

transferring the developed layer of the three-dimensional part from the surface of the photoconductor component to the transfer component while the transfer component is rotating in a second counter rotational direction that is synchronized with and counter to the second rotational direction of the photoconductor component;

heating the developed layer of the three-dimensional part on the transfer component while the transfer component is rotating in the second counter rotational direction; and transferring the heated layer of the three-dimensional part from the transfer component onto the layer of the support structure previously transferred to the platen.

16. The method of claim 15, and further comprising:

moving the platen in the first direction and at a synchronized rate with the rotation of the transfer component in the first counter rotational direction; and moving the platen in a second direction and at a synchronized rate with the rotation of the transfer component in the second counter rotational direction.

17. The method of claim 15, and further comprising further heating the layer of the three-dimensional part that is transferred onto the layer of the support structure.

18. The method of claim 15, and further comprising developing a layer of a third material from a third development station onto the surface of the photoconductor component while the photoconductor component is rotating in the second rotational direction.

19. The method of claim 15, and further comprising rotating a carousel comprising the second development station and at least one additional development station.

20. The method of claim 15, and further comprising:

cooling a surface of the transfer component after transferring the heated layer of the support structure to the platen and while the transfer component is rotating in the first counter rotational direction; and cooling the surface of the transfer component after transferring the heated layer of the three-dimensional part onto the layer of the support structure and while the transfer component is rotating in the second counter rotational direction.

* * * * *